(12) United States Patent
Matsumoto et al.

(10) Patent No.: US 7,177,002 B2
(45) Date of Patent: *Feb. 13, 2007

(54) LIQUID CRYSTAL DISPLAY WITH ZIGZAG SHAPED PIXEL AND COUNTER ELECTRODES WITH NOTCH FORMED IN CONCAVE PORTION OF PIXEL AND COUNTER ELECTRODES

(75) Inventors: Shinzo Matsumoto, Mobara (JP); Yoshiaki Nakayoshi, Ooamishirasato (JP); Ken Sasaki, Mobara (JP); Masaki Mega, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/209,686

(22) Filed: Aug. 24, 2005

(65) Prior Publication Data
US 2006/0050220 A1    Mar. 9, 2006

Related U.S. Application Data

(63) Continuation of application No. 10/636,560, filed on Aug. 8, 2003, now Pat. No. 6,950,167.

(30) Foreign Application Priority Data
Sep. 20, 2002    (JP) .............................. 2002-275033

(51) Int. Cl.
*G02F 1/1343*    (2006.01)
(52) U.S. Cl. ...................... 349/141; 349/142; 349/145; 349/146

(58) Field of Classification Search ........ 349/141–142, 349/145–146
See application file for complete search history.

(56) References Cited

U.S. PATENT DOCUMENTS

| | | | |
|---|---|---|---|
| 5,745,207 | A | 4/1998 | Asada et al. |
| 6,208,399 | B1 | 3/2001 | Ohta et al. |
| 6,266,116 | B1 | 7/2001 | Ohta et al. |

(Continued)

FOREIGN PATENT DOCUMENTS

| | | |
|---|---|---|
| JP | 2000-56320 | 8/1998 |
| JP | 2002-40456 | 7/2000 |

*Primary Examiner*—Andrew Schechter
*Assistant Examiner*—Phu Vu
(74) *Attorney, Agent, or Firm*—Reed Smith LLP; Stanley P. Fisher, Esq.; Juan Carlos A. Marquez, Esq.

(57) ABSTRACT

Pixel regions are formed on a liquid-crystal-side surface of one substrate out of respective substrates which are arranged to face each other in an opposed manner with liquid crystal therebetween, wherein each pixel region includes pixel electrodes having bent portions and counter electrodes which are arranged at positions where the pixel electrodes are shifted in parallel, the pixel electrode and the counter electrode are respectively constituted of two electrodes which are overlapped to each other as an upper layer and a lower layer by way of an insulation film, and to the lower-layer side electrode of at least one electrode out of the pixel electrode and the counter electrode, projections which further project from crests of convex-portion sides of the bent portions and extend toward another electrode side are provided.

8 Claims, 26 Drawing Sheets

U.S. PATENT DOCUMENTS

| | | |
|---|---|---|
| 6,288,763 B1 | 9/2001 | Hirota |
| 6,771,343 B2 | 8/2004 | Kim et al. |
| 2002/0033922 A1* | 3/2002 | Hidehira et al. ............ 349/141 |
| 2003/0043327 A1* | 3/2003 | Aoyama et al. ............ 349/141 |

* cited by examiner

TH　　　　　TH

LIQUID CRYSTAL DISPLAY WITH ZIGZAG SHAPED PIXEL AND COUNTER ELECTRODES WITH NOTCH FORMED IN CONCAVE PORTION OF PIXEL AND COUNTER ELECTRODES

This application is a Continuation application of U.S. application Ser. No. 10/636,560 filed on Aug. 8, 2003 now U.S. Pat. No. 6,650,167. Priority is claimed based on U.S. application Ser. No. 10/636,560 filed on Aug. 8, 2003, which claims priority to Japanese Patent Application No. 2002-275033 filed on Sep. 20, 2002, all of which is incorporated by reference.

BACKGROUND OF THE INVENTION

1. Field of the Invention

The present invention relates to a liquid crystal display device, and more particularly to a liquid crystal display device of high quality which enhances display quality by enhancing the numerical aperture and suppressing regions where a domain occurs.

2. Description of the Related Art

A so-called lateral electric field type (IPS type) liquid crystal display device is constituted such that on each pixel region formed on a liquid crystal side surface of one of substrates which are arranged to face each other with liquid crystal sandwiched therebetween, a pixel electrode and a counter electrode which generates an electric field between the pixel electrode and the counter electrode are formed, and liquid crystal is activated by components of the electric field including parallel to the substrate.

In the active matrix type liquid crystal display device to which such a structure is applied, first of all, on the liquid crystal side surface of one substrate, respective regions which are surrounded by a plurality of juxtaposed gate signal lines and a plurality of juxtaposed drain signal lines which cross these gate signal lines constitute pixel regions.

Then, each pixel region includes a thin film transistor which is operated in response to a scanning signal from the gate signal line, the pixel electrode to which a video signal is supplied from a drain signal line through the thin film transistor, and the counter electrode to which a signal which becomes reference with respect to the video signal is supplied.

Here, the pixel electrode and the counter electrode are formed in a strip-like pattern which extends in one direction, wherein the respective electrodes are usually constituted of two or more electrodes and are alternately arranged.

Further, in such a constitution, following type of liquid crystal display device is known, that is the counter electrodes are formed on an upper surface of an insulation film formed to cover also the drain signal lines and, at the same time, the counter electrodes are formed along the drain signal lines such that the counter electrodes have the center axes thereof substantially aligned with the drain signal lines and have a width larger than a width of the drain signal lines. This is because those lines of electric force from the drain signal lines can be easily terminated at the counter electrodes disposed above the drain signal lines and it is possible to prevent the lines of electric forces from being terminated to the pixel electrodes. That is, when lines of electric forces are terminated at the pixel electrodes, this gives rise to noises.

Then, the respective counter electrodes are formed integrally with counter voltage signal lines formed on an upper surface of the insulation film on the same layer and reference signals are supplied to respective counter electrodes through these counter voltage signal lines.

Further, there has been known a liquid crystal display device which adopts a so-called multi-domain system in which the pixel electrodes and the counter electrodes which are alternately arranged are formed in a pattern in which these electrodes have a large L-shaped bent portion.

With respect to liquid crystal, even when the molecular arrangement is at the same state, the polarized state of transmitting light is changed in response to the incident direction of light which is incident on a liquid crystal display panel and hence, optical transmissivity differs corresponding to the incident direction of light.

Such viewing-angle dependency of the liquid crystal display panel induces a luminance inversion phenomenon when a viewing point is obliquely inclined with respect to a viewing angle direction and hence, the liquid crystal display panel exhibits display characteristics that images are colored in a case of color display.

Accordingly, the pixel electrode is formed in a pattern in which at least one bent portion is formed in the extending direction and the counter electrode is formed in a shape which shifts this pattern in parallel, and using an imaginary line which connects bent points of these respective electrodes as a boundary, the direction of an electric field acting between respective electrodes differ between one region and the other region whereby coloring of images dependent on the viewing angle is compensated.

SUMMARY OF THE INVENTION

However, with respect to the liquid crystal display device having such a constitution, in a design pattern of electrodes having "the L-shaped" bent portions, when etching is performed during the formation of electrodes, concave/convex portions of the bent portions become smooth or rounded and are formed into a shape close to a straight line. When this occurs, a domain region (a region which is also referred to as a discrimination region in which a portion which has the electric field direction different from the normal electric field direction is formed and hence, display is not performed normally) spreads. Further, being influenced by irregularities of etching conditions, this tendency is changed. Such a tendency becomes more apparent with the use of a transparent conductive film made of ITO (Indium Tin Oxide), ITZO (Indium Tin Zinc Oxide) as a material of the counter electrodes.

Further, it has been known that when a so-called NB (normally black) display is adopted, the domain region is displayed dark even when this portion is subjected to bright display thus giving rise to difference with respect to desired luminance to be displayed. Particularly, with respect to the high-definition pixels of 200 ppi class, it is needless to say that the adverse influence which this region occupying an opening portion of one pixel gives to the display characteristics cannot be ignored.

For example, even when the pixel seems to display the normal luminance value, due to the influence of the domain region, the pixel is recognized as a pixel with darkened luminance. Further, this difference is changed in a finish pattern thus causing luminance irregularities within a screen. Further, the occurrence of this domain also becomes a cause for giving an adverse influence that a rising response speed of liquid crystal molecule is lowered.

Further, although the large enhancement of numerical aperture can be expected in the liquid crystal display system, as a byproduct, it is necessary to overlap the counter electrode (transparent conduct film) having a width about 3 times as large as a width of the drain signal line by way of a protective film formed of an organic material layer and hence, particularly with respect to the high-definition pixels of about 200 ppi, a sufficient electrode interval cannot be insured.

For example, when the drain signal line having a width of 6 μm is used, it is necessary to cover the drain signal line with the counter electrode having a width of 18 μm. That is, when the width of the counter electrode is narrowed, electric-field noises from the drain signal line intrudes into the liquid crystal layer between the pixel electrode and the counter electrode and hence, the normal luminance curve is changed in response to signals from the drain signal line whereby a so-called smear phenomenon that the luminance curve is changed is observed. Accordingly, although efforts have been made to relatively narrow the drain signal line to 4–5 μm, with respect to a large-sized panel, there arises a drawback that disconnection of the drain signal lines frequently occurs.

Further, in such type liquid crystal display device, it may be possible to integrally form the counter voltage signal line which supplies a voltage to the counter electrode and the counter electrode. However, when the counter voltage signal line is arranged at the center of pixel region, it is necessary to arrange a through hole formed in an organic protective film PAS at the center portion of the screen. In this case, the disturbance of orientation or the disturbance of electric field is generated in this portion thus giving rise to a drawback that the contrast is lowered and the numerical aperture is lowered in the black display.

The present invention has been made under such circumstances and it is an advantage of the present invention to provide a liquid crystal display device which can enhance display quality by enhancing numerical aperture and by suppressing the occurrence of domains.

Here, designing of bent portions of comb-teeth electrodes is disclosed in Japanese Patent Laid Open 2002-40456 and Japanese Patent Laid Open 2000-56320, for example.

The advantage, other advantages and novel features of the present invention will become apparent from the description of this specification and attached drawings.

To briefly explain the summary of typical inventions among the inventions disclosed in this specification, they are as follows.

(1) The liquid crystal display device according to the present invention is, for example, characterized in that on each pixel region formed on a liquid-crystal-side surface of one substrate out of respective substrates which are arranged to face each other in an opposed manner with liquid crystal therebetween, a pixel electrode having a bent portion and a counter electrode which is arranged at a position where the pixel electrode is shifted in parallel are formed, at least one electrode out of the pixel electrode and the counter electrode is constituted of two electrodes which are superposed as an upper layer and a lower layer by way of an insulation film, and a projection which is further projected from a crest of a convex-side portion of the bent portion toward another electrode side is formed on the lower-layer-side electrode out of two electrodes.

(2) The liquid crystal display device according to the present invention is, for example, characterized in that on the premise of the constitution (1), in the lower-layer-side electrode of the another electrode, a notched portion which further cuts off a bottom portion of a concave-portion side of the bent portion is formed.

(3) The liquid crystal display device according to the present invention is, for example, characterized in that on the premise of the constitution (1), an insulation film interposed between two pixel electrodes and an insulation film interposed between two counter electrodes differ in the number of lamination.

(4) The liquid crystal display device according to the present invention is, for example, characterized in that on a liquid-crystal-side surface of one substrate out of respective substrates which are arranged to face each other in an opposed manner with liquid crystal therebetween, regions which are surrounded by a plurality of juxtaposed gate signal lines and a plurality of juxtaposed drain signal lines which cross these gate signal lines are formed as pixel regions, a thin film transistor driven in response to a scanning signal from the gate signal line and a pixel electrode to which a video signal is supplied from the drain signal line through a drain electrode and a source electrode of the thin film transistor are provided to the inside of each pixel region, the drain signal line is formed in a zigzag shape having bent portions at a portions where the drain signal line crosses the gate signal line and at least at a substantially center portion of the pixel region, the thin film transistor is formed in the vicinity of the concave-portion side of the bent portion of the drain signal line, the drain electrode is formed of a portion of the drain signal line, and the source electrode is formed so as to face the drain electrode in an opposed manner with a channel length in the running direction of the gate signal line.

(5) The liquid crystal display device according to the present invention is, for example, characterized in that on the premise of the constitution (4), the source electrode of the thin film transistor is connected to the pixel electrode, and the vicinity of the connecting portion of the pixel electrode with the source electrode includes an extension having a pattern which reduces a domain between the pixel electrode and the counter electrode and blocks electric field noises from the gate signal line by shielding.

(6) The liquid crystal display device according to the present invention is, for example, characterized in that on the premise of the constitution (4), the thin film transistor is arranged between extensions of the pixel electrode and the counter electrode which are arranged close to each other.

(7) The liquid crystal display device according to the present invention is, for example, characterized in that on a liquid-crystal-side surface of one substrate out of respective substrates which are arranged to face each other in an opposed manner with liquid crystal therebetween, regions which are surrounded by a plurality of juxtaposed gate signal lines and a plurality of juxtaposed drain signal lines which cross these gate signal lines are formed as pixel regions, a thin film transistor driven in response to a scanning signal from the gate signal line and a pixel electrode to which a scanning signal is supplied from the drain signal line through a drain electrode and a source electrode of the thin film transistor are provided to the inside of each pixel region, the drain signal line is formed in a zigzag shape having bent portions at portions where the drain signal line crosses the gate signal line and at least at a substantially center portion of the pixel region, the thin film transistor is formed in a pattern in which a side of the drain electrode which faces the source electrode in an opposed manner has a concave portion and also in a pattern in which a side of the source electrode which faces the drain electrode in an opposed manner has a convex portion.

(8) The liquid crystal display device according to the present invention is, for example, characterized in that on the premise of the constitution (7), the drain electrode of the thin film transistor uses the pattern of the bent portion of the drain signal line as it is.

(9) The liquid crystal display device according to the present invention is, for example, characterized in that on a liquid-crystal-side surface of one substrate out of respective substrates which are arranged to face each other in an opposed manner with liquid crystal therebetween, pixel regions which are surrounded by a plurality of juxtaposed gate signal lines and a plurality of juxtaposed drain signal lines which cross these gate signal lines are formed, on each pixel region, a switching element which is driven in response to a scanning signal from the gate signal line, a pixel electrode to which a video signal is supplied from the drain signal line through the switching element, and a counter electrode which is connected to a counter voltage signal line and generates an electric field between the pixel electrode and the counter electrode are formed, the counter electrode includes a lower-layer counter electrode and an upper-layer counter electrode which is formed above the lower-layer counter electrode, the lower-layer counter electrode is formed such that the lower-layer counter electrodes are respectively arranged at both sides of the drain signal line through the drain signal line and a first insulation film, and the upper-layer counter electrode is formed such that the upper-layer counter electrode covers the drain signal line and the lower-layer counter electrodes by way of the second insulation film.

(10) The liquid crystal display device according to the present invention is, for example, characterized in that on the premise of the constitution (9), the drain signal line and the lower-layer counter electrodes which are arranged at both sides of the drain signal line have bent portions and, at the same time, projections which are further projected from crests at convex-sides of the bent portions of the lower-layer counter electrodes and are extended, to the pixel electrode side are formed.

(11) The liquid crystal display device according to the present invention is, for example, characterized in that on each pixel region formed on a liquid-crystals-side surface of one substrate out of respective substrates which are arranged to face each other with liquid crystal therebetween, a pixel electrode having a bent portion and a counter electrode which is arranged at a position where the pixel electrode is shifted in parallel, and a projection which is projected from a crest of the convex-portion side of the bent portion of one electrode out of the pixel electrode and the counter electrode toward a bottom portion of the concave-portion side of the bent portion of another electrode which faces one electrode in an opposed manner are formed, and the bottom portion of the concave-portion side of the bent portion of the another electrode is notched to form a notched portion.

(12) The liquid crystal display device according to the present invention is, for example, characterized in that on the premise of the constitution (9), the respective lower-layer counter electrodes which are arranged at both sides of the drain signal line are connected to each other by a connector which is arranged to cross the drain signal line.

(13) The liquid crystal display device according to the present invention is, for example, characterized in that on the premise of the constitution (9) or (12), the lower-layer counter electrodes are bent away from each other such that the lower-layer counter electrodes are not overlapped to the drain signal line at a side of the gate signal line.

(14) The liquid crystal display device according to the present invention is, for example, characterized in that on a liquid-crystal-side surface of one substrate out of respective substrates which are arranged to face each other in an opposed manner with liquid crystal therebetween, pixel regions which are surrounded by a plurality of juxtaposed gate signal lines and a plurality of juxtaposed drain signal lines which cross these gate signal lines are formed, on each pixel region, a switching element which is driven in response to a scanning signal from the gate signal line, a pixel electrode to which a video signal is supplied from the drain signal line through the switching element, and a counter electrode which is connected to a counter voltage signal line and generates an electric field between the pixel electrode and the counter electrode are formed, the counter electrode includes a lower-layer counter electrode and an upper-layer counter electrode which is formed above the lower-layer counter electrode, the lower-layer counter electrode is formed such that lower-layer counter electrode is constituted of an intermediate conductive layer between the drain signal line and the gate signal line, is insulated from the drain signal line by way of a first insulation film and is insulated from the gate signal line by way of a third insulation film, is arranged in the vicinity of at least one signal line out of the drain signal line and the gate signal line, and is extended in the extending direction of the drain signal line.

(15) The liquid crystal display device according to the present invention is, for example, characterized in that on the premise of the constitution (14), the lower-layer counter electrode constitutes an overlapped region together with the pixel electrode by way of the first insulation film and forms a holding capacitance in the region.

(16) The liquid crystal display device according to the present invention is, for example, characterized in that on the premise of the constitution (14) or (15), the upper-layer counter electrode and lower-layer counter electrode are electrically connected to each other over the gate signal line within the pixel region via a through hole.

(17) The liquid crystal display device according to the present invention is, for example, characterized in that on a liquid-crystal-side surface of one substrate out of respective substrates which are arranged to face each other in an opposed manner with liquid crystal therebetween, pixel regions which are surrounded by a plurality of juxtaposed gate signal lines and a plurality of juxtaposed drain signal lines which cross these gate signal lines are formed, on another substrate, color filters having bent portions are formed within the pixel region, and projections which are further projected from crests of convex-portion sides of the bent portions are formed or notched portions are formed at the concave-portion sides of the bent portions.

Here, the present invention is not limited to the constitution and various modification can be conceived without departing from the technical concept of the present invention.

DESCRIPTION OF THE PREFERRED EMBODIMENTS

Preferred embodiments of the present invention are explained hereinafter in conjuction with attached drawings.

Embodiment 1

<<Whole Construction>>

Figure 24A:
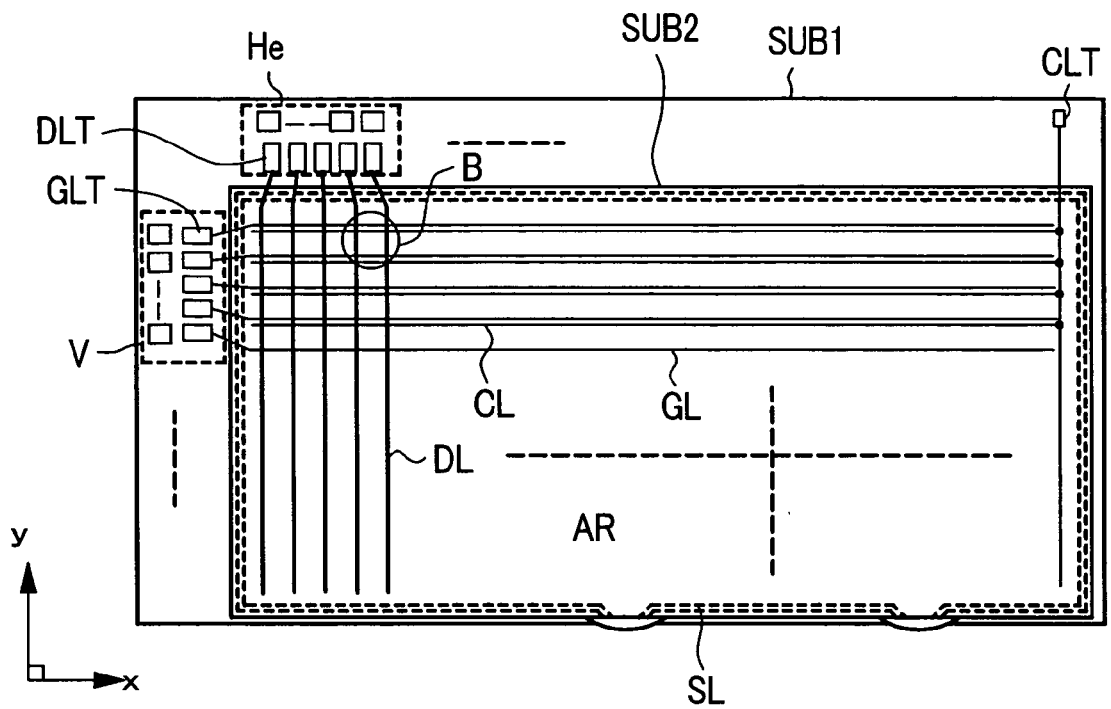
FIG. 24 is a plan view showing one embodiment of the whole of a liquid crystal display device according to the present invention.
Figure 24B:
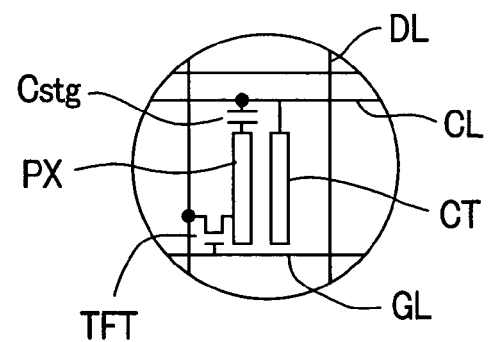

FIG. 24 is a plan view showing one embodiment of the constitution of the whole liquid crystal display device according to the present invention. The drawing is drawn corresponding to an actual geometric arrangement although a portion thereof is depicted as an equivalent circuit.

In the drawing, there are provided a pair of transparent substrates SUB1, SUB2 which are arranged to face each other in an opposed manner with liquid crystal therebetween. The liquid crystal is filled and sealed in a space defined between these substrates SUB1, SUB2 using a sealing material SL which also has a function of fixing another transparent substrate SUB2 to one transparent substrate SUB1.

One a liquid-crystal-side surface of one transparent substrate SUB1 which is surrounded by the sealing material SL, a plurality of gate signal lines GL which extend in the x direction and are juxtaposed in the y direction and a plurality of drain signal lines DL which extend in the y direction and are juxtaposed in the x direction are formed.

Respective regions surrounded by respective gate signal lines GL and respective drain signal lines DL constitute pixel regions and, at the same time, a mass of these respective pixel regions in a matrix array constitute a liquid crystal display part AR.

In respective pixel regions which are juxtaposed in the x direction, a common counter voltage signal line CL which runs within respective pixel regions is formed. The counter voltage signal line CL constitutes a signal line which supplies a voltage which becomes the reference with respect to video signals to counter electrodes CT of respective pixel regions which will be explained later.

Each pixel region includes a thin film transistor TFT which is operated in response to a scanning signal supplied from one-side gate signal line GL and a pixel electrode PX to which the video signals are supplied from the one-side drain signal line DL through the thin film transistor TFT.

The pixel electrode PX generates an electric field between the pixel electrode PX and the counter electrode CT connected to the counter voltage signal line CL and optical transmissivity of the liquid crystal is controlled in response to the electric field.

Respective ends of the gate signal line GL extend over the sealing material SL and extended ends of the gate signal line GL constitute terminals GLT to which output terminals of a scanning signal drive circuit V are connected. Further, input terminals of the scanning signal drive circuit V are configured such that signals supplied from a printed circuit board (not shown in the drawing) which is arranged outside a liquid crystal display panel are inputted thereto.

The scanning signal drive circuit V is constituted of a plurality of semiconductor devices, wherein a plurality of neighboring gate signal lines GL which are arranged close to each other are formed into a group and one semiconductor device is allocated to each group.

In the same manner, respective one ends of the drain signal lines DL extend over the sealing material SL and the extending ends of the drain signal line DL constitute terminals DLT to which output terminals of a vide signal drive circuit He are connected. Further, input terminals of the video signal drive circuit He are configured such that signals supplied from a printed circuit board (not shown in the drawing) which is arranged outside a liquid crystal display panel are inputted thereto.

The video signal drive circuit He is also constituted of a plurality of semiconductor devices, wherein a plurality of neighboring drain signal lines DL which are arranged close to each other are formed into a group and one semiconductor device is allocated to each group.

Further, the counter voltage signal lines have right-side end portions thereof in the drawing connected in common and a connection line thereof extends over the sealing material SL and an extended end constitutes a terminal CLT. A voltage which becomes the reference with respect to the video signal is supplied from these terminals.

With respect to respective gate signal lines GL, in response to a scanning signal from the scanning signal drive circuit V, one of them is sequentially selected.

Further, to respective drain signal lines DL, a video signal is supplied from the video signal drive circuit He at the timing of selecting the gate signal lines GL.

Here, in the above-mentioned embodiment, although the scanning signal drive circuit V and the video signal drive circuit He are indicated as semiconductor devices mounted on the transparent substrate SUB1, tape carrier type semiconductor devices which are connected astride the transparent substrate SUB1 and a printed circuit board may be used. Further, when a semiconductor layer of the thin film transistor TFT is made of polycrystalline silicone (p-Si), the semiconductor element made of polycrystalline silicon may be formed on the transparent substrate SUB1 together with a wiring layer.

<<Constitution of Pixel>>

Figure 1A:
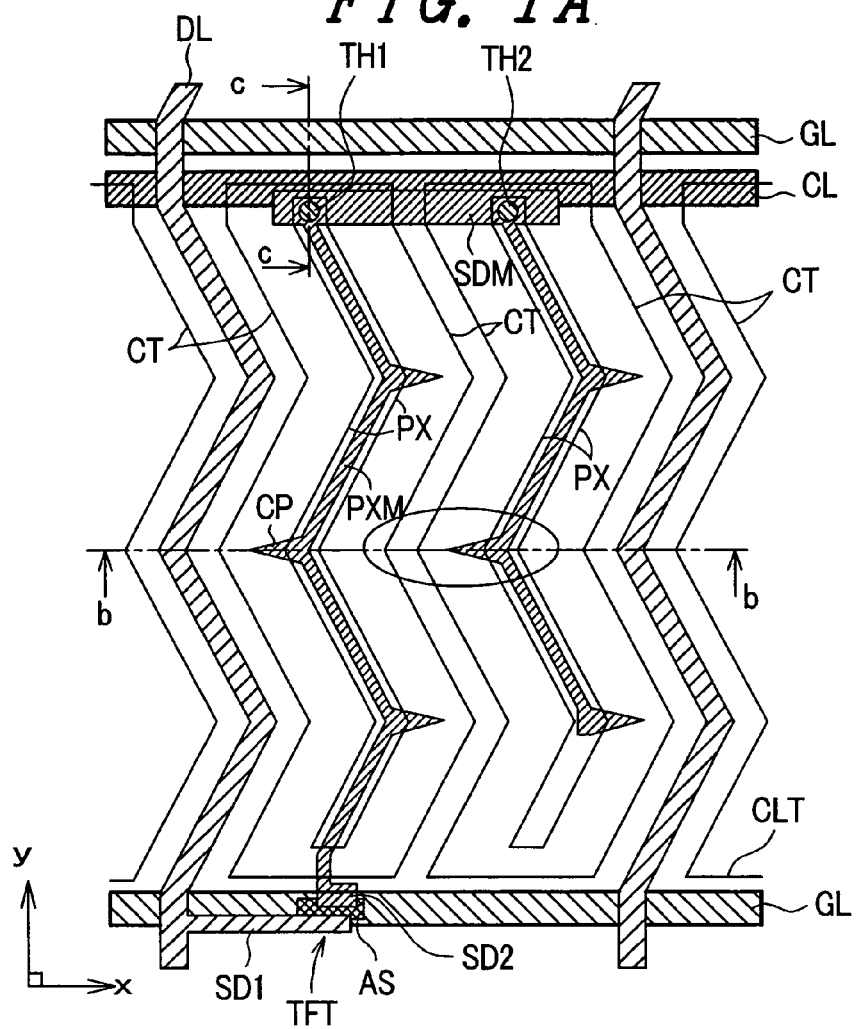
FIG. 1 is a constitutional view showing one embodiment of a pixel of a liquid crystal display device according to the present invention.
Figure 1B:
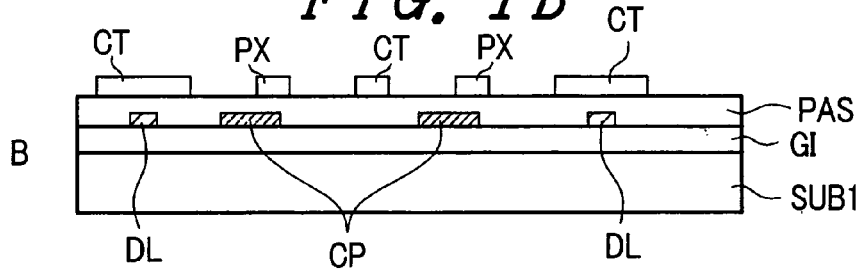
Figure 1C:
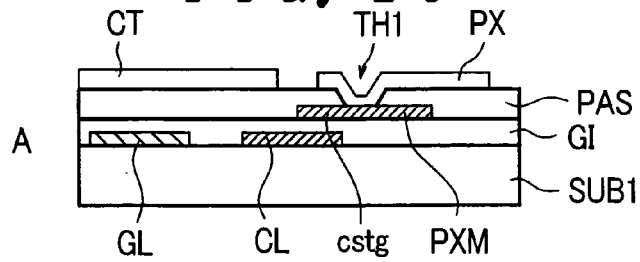

FIG. 1 is a view showing one embodiment of the specific constitution of the pixel, wherein FIG. 1A is a plan view, FIG. 1B is a cross-sectional view taken along a line b—b in FIG. 1A, and FIG. 1C is a cross-sectional view taken along a line c—c in FIG. 1A.

On the liquid-crystal-side surface of the transparent substrate SUB1, first of all, a pair of gate signal lines GL which extend in the x direction and are juxtaposed in the y direction are formed.

These gate signal lines GL surround a rectangular region together with a pair of drain signal lines DL described later and this region is configured to constitute the pixel region.

Further, in portions within the pixel region which are close to the gate signal lines GL, the counter voltage signal lines CL are formed in parallel to the gate signal line GL and these counter voltage signal lines CL are formed such that each counter voltage signal line CL runs inside respective pixel regions which are juxtaposed in the x direction in the drawing.

Over the surface of the transparent substrate SUB1 on which the gate signal lines GL and the counter voltage signal lines CL are formed, an insulation film GI (see FIG. 1B, C) made of SiN, for example, is formed such that the insulation film GI also covers the gate signal lines GL and the counter voltage signal lines CL.

The insulation film GI is configured to perform a function as an interlayer insulation film with respect to the gate signal lines GL in regions where the drain signal lines DL described later are formed and a function as a gate insulation film in regions where the thin film transistors TFT described later are formed.

Then, over the surface of the insulation film GI, semiconductor layers AS made of amorphous Si, for example, are formed such that each semiconductor layer AS is overlapped to a portion of the gate signal line GL.

This semiconductor layer AS is a semiconductor layer of the thin film transistor TFT, wherein by forming a drain electrode SD1 and a source electrode SD2 over the semiconductor layer AS, it is possible to constitute an MIS type transistor structure having an inversed staggered structure which uses a portion of the gate signal line GL as the gate electrode.

Here, the drain electrode SD1 and the source electrode SD2 are simultaneously formed at the time of forming the drain signal lines DL.

That is, the drain signal lines DL which extend in the y direction and are juxtaposed in the x direction are formed, the portion of the drain signal line DL is extended over an upper surface of the semiconductor layer AS so as to form the drain electrode SD1, and the source electrode SD2 is formed in a spaced apart manner by a length of channel of the thin film transistor TFT from the drain electrode SD1.

Further, the source electrode SD2 is integrally formed with a lower-layer pixel electrode PXM which is formed within the pixel region. Here, the lower-layer pixel electrode PXM is arranged to be partially overlapped to the upper-layer pixel electrode PX described later and hence is expressed in a distinguished manner from the upper-layer pixel electrode PX.

That is, the lower-layer pixel electrode PXM is constituted of a group consisting of a plurality of electrodes (two in the drawing) which extend in the y direction and are juxtaposed in the x direction within the pixel region. One end portion of one of these lower-layer pixel electrodes PXM also functions as the source electrode SD2 and another end portion of one of these lower-layer pixel electrodes PXM is electrically connected with a corresponding portion of another lower-layer pixel electrodes PXM.

Further, the lower-layer pixel electrodes PXM are formed in a zigzag shape in the y direction in the drawing together with the upper-layer pixel electrodes PX and the counter electrodes CT described later thus forming the constitution which adopts a so-called multi-domain system.

For example, in FIG. 1A, each lower-layer pixel electrode PXM includes three bent portions, and on the respective bent portions, respective projections CP which are further projected from convex-portion side crests of the respective bent portions are integrally formed with the lower-layer pixel electrode PXM, for example. The manner of operation or the function of these projections CP are explained later.

Here, although not shown in the drawing, thin layers which are doped with impurities of high concentration are formed on interfaces between the semiconductor layer AS and the drain electrode SD2 and the source electrode SD2 and these layers function as contact layers.

With respect to these contact layers, at the time of forming the semiconductor layer AS, for example, impurity layers of high concentration are already formed on surfaces thereof. Accordingly, using a pattern of the drain electrode SD1 and the source electrode SD2 formed on an upper surface of the semiconductor layer AS as a mask, the contact layers can be formed by etching the impurity layers which are exposed from the pattern.

On the surface of the transparent substrate SUB1 on which the thin film transistors TFT, the drain signal lines DL, the drain electrodes SD1, the source electrodes SD2 and the lower-layer pixel electrodes PXM are formed, a protective film PAS is formed. The protective film PAS is served for obviating the direct contact of the thin film transistors TFT with the liquid crystal and is configured to prevent the degradation of characteristics of the thin film transistors TFT.

Here, the protective film PAS is constituted of a sequential laminated body consisting of an inorganic material layer made of a material such as SiN and an organic material layer made of a material such as resin or is constituted of only an organic material layer as shown in FIG. 1B or FIG. 1C. At least the organic material layer is used as the protective film PAS for reducing the dielectric constant of the protective film.

On an upper surface of the protective film PSV, the upper-layer pixel electrode PX, the counter electrode CT and the counter voltage signal line CLt are respectively formed. All of the upper-layer pixel electrode PX, the counter electrode CT and the counter voltage signal line CLt are formed of a light-transmitting conductive film made of ITO (indium tin oxide), ITZO (indium tin zinc oxide), IZO (indium zinc oxide), $SnO_2$ (tin oxide), $In_2O_3$ (indium oxide). This provision is made to enhance the so-called numerical aperture of the pixel.

First of all, each upper-layer pixel electrode PX is formed in an overlapped manner on the lower-layer pixel electrode PXM except for both end portions thereof. One end portion (an upper-side end portion in the drawing) of the upper-layer pixel electrode PX is connected to a connecting portion of each lower-layer pixel electrode PXM via through holes TH1, TH2 which are formed in the protective film PAS. Due to such a constitution, the lower-layer pixel electrodes PXM and the upper-layer pixel electrodes PX are always held at the equal potential.

In this case, each upper-layer pixel electrode PX is arranged such that a center axis thereof in the running direction is substantially aligned with the lower-layer pixel electrode PXM and has a width larger than a width of the lower-layer pixel electrode PXM.

Here, in this case, the projection CP which is formed on the lower-layer pixel electrode PXM is preliminarily formed such that the projection CP extends from the lower-layer pixel electrode PXM to an extent that the projection CP is sufficiently projected from the upper-layer pixel electrode PX.

Here, the projection CP formed in the lower-layer pixel electrode PXM is not formed on the upper-layer pixel electrode PX. That is, although the projection CP is formed on the lower-layer pixel electrode PXM, the projection CP is not formed on the upper-layer pixel electrode PX.

Further, the counter electrode CT is constituted of a group of electrodes consisting of a plurality of (three in the drawing) electrodes which extend in the y direction and are juxtaposed in the x direction in the same manner as the upper-layer pixel electrodes PX. Respective counter electrodes CT are arranged such that they are formed in a zigzag shape in the running direction and are in parallel with the above-mentioned upper-layer pixel electrodes PX.

Still further, each counter electrode CT is, when viewed in plan, positioned between the upper-layer pixel electrodes PX.

That is, the counter electrodes CT and the upper-layer pixel electrodes PX are arranged in order of the counter electrode CT, the upper-layer pixel electrode PX, the counter electrode CT, the upper-layer pixel electrode PX, . . . , the counter electrode CT from the one-side drain signal line DL to another-side drain signal line DL at an equal interval respectively.

Here, the counter electrodes CT which are positioned at both sides of the pixel region are formed such that the counter electrodes CT are overlapped to the drain signal lines DL. Due to such a constitution, the drain signal lines DL are formed in a zigzag shape in conformity with the pattern of the counter electrodes CT. Further, the counter electrodes CT are formed in common with the corresponding counter electrodes CT of other pixel regions which are disposed close to each other in the x direction.

That is, the counter electrode CT is overlapped to the drain signal line DL such that a center axis of the counter electrode CT is substantially aligned with a center axis of the drain signal line DL, and a width of the counter electrode CT is set larger than a width of the drain signal line DL. The left-side counter electrode CT which is projected with respect to the drain signal line DL constitutes one of respective counter electrodes CT of the left-side pixel region, while the right-side counter electrode CT which is projected with respect to the drain signal line DL constitutes one of respective counter electrodes CT in the right-side pixel region.

In this manner, by forming the counter electrode CT having the width larger than the width of the drain signal line DL above the drain signal line DL, it is possible to obtain an advantageous effect that lines of electric forces from the drain signal line DL are terminated to the counter electrodes CT while obviating the termination of the lines of electric forces to the upper-layer pixel electrodes PX (and the lower-layer pixel electrodes PXM). When lines of electric force from the drain signal lines DL are terminated to the upper-layer pixel electrodes PX (and the lower-layer pixel electrodes PXM), this gives rise to noises.

Further, respective counter electrodes CT which are formed of a group of electrodes are integrally formed with the counter voltage signal lines CLt which are formed of the same material as the counter electrodes CT and are formed to sufficiently cover the gate signal lines GL. The counter voltage signal lines CLt are electrically connected to the previously-mentioned counter voltage signal lines CL to each other in regions not shown in the drawing.

The reason that the counter voltage signal lines CL are provided separately from the counter voltage signal lines CLt lies in that since the counter voltage signal lines CLt are made of a material having large resistance, with the provision of the counter voltage signal line CL having small resistance, the overall resistance can be reduced.

Below the counter voltage signal lines CL, CLt or the counter electrodes CT, the source electrodes SD2 of the thin film transistors TFT or the pixel electrodes PX are positioned. Due to such a constitution, a capacitive element Cstg which uses a gate insulation film GI as a dielectric film is formed between the pixel electrode PX and the counter voltage signal line CL.

This capacitive element Cstg is configured to have a function of storing video signals supplied to the pixel electrode PX, for example, for a relatively long period.

Then, over the upper surface of the transparent substrate SUB1 on which the upper-layer pixel electrodes PX, the counter electrodes CT and the counter voltage signal lines CLt are formed in this manner, an orientation film (not shown in the drawing) is formed such that the orientation film also covers these components. The orientation film is a film which is directly brought into contact with the liquid crystal and determines the initial orientation direction of molecules of the liquid crystal by rubbing which is applied to a surface thereof.

<<Observation>>

The pixel electrodes PX, PXM and the counter electrodes CT having the above-mentioned constitution are configured to solve the following respective drawbacks with the use of projections CP formed on the lower-layer pixel electrodes PXM. That is, the above-mentioned electrodes PX, PXM and CT can solve the drawbacks that these bent portions, compared to portions between other pixel electrodes PX, PXM and the counter electrodes CT, exhibit the larger distance and the direction of an electric field is changed whereby a delay of response speed occurs or domains are generated.

Here, the reason that the projections CP are formed on the pixel electrode PXM is to prevent a phenomenon that since the pixel electrode PXM is formed of a layer different from a layer of the counter electrodes CT, the distance between the projection CP and the counter electrode CT becomes close to each other thus an electric short-circuiting is liable to be easily generated.

However, in this case, when only the lower-layer pixel electrodes PXM are formed as the pixel electrodes, the electric field generated between the projections CP of the lower-layer pixel electrodes PXM and the counter electrodes CT is surely controlled by an electric field which is substantially perpendicular to the transparent substrate SUB1 at the most portion. This is because that with respect to an electric field between a pair of electrodes which are arranged to close each other in a plan view, by interposing the protective film PAS having a relatively thick film thickness, an electric field having components substantially parallel to the transparent substrate SUB1 is decreased and an electric field in the direction having components substantially perpendicular to the transparent substrate SUB1 is increased. In this case, the liquid crystal in use is activated in response to an electric field having components substantially parallel to the transparent substrate SUB1 and hence, this implies that the mere provision of projections CP to the lower-layer pixel electrodes PXM cannot realize the original task.

Accordingly, in this embodiment, also over the protective film PAS, the upper-layer pixel electrodes PX having the normal pattern (a pattern which has no projections corresponding to the projections CP) are formed in an overlapped manner on the lower-layer pixel electrodes PXM and, at the same time, out of the electric field generated in the vicinity of the bent portions between the upper-layer pixel electrodes PX and the counter electrodes CT, it is possible to ensure the components of electric field substantially parallel to the transparent substrate SUB1 as much as possible.

Embodiment 2

Figure 2:
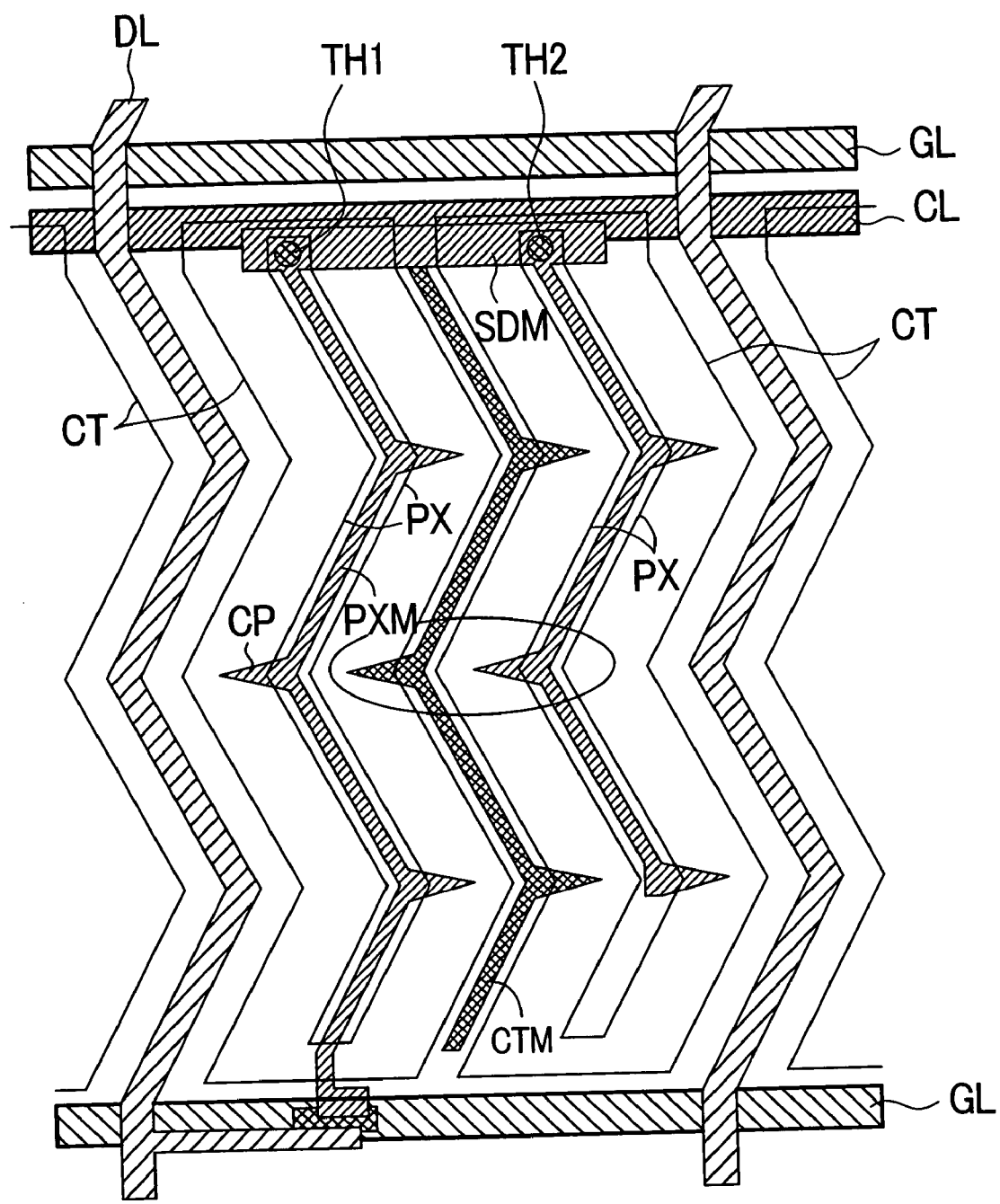
FIG. 2 is a plan view showing another embodiment of a pixel of a liquid crystal display device according to the present invention.

FIG. 2 is a plan view showing another embodiment of the pixel of the liquid crystal display device according to the present invention and corresponds to FIG. 1A.

The constitution which makes this embodiment different from the embodiment shown in FIG. 1A lies in that the lower-layer counter electrode CTM is also formed by way of an insulation film below the counter electrode CT (excluding the counter electrode CT formed over the drain signal line DL in an overlapped manner) which is arranged substantially at the center of the pixel region. Accordingly, to discriminate the counter electrode CT and the lower-layer counter electrode CTM, the counter electrode CT may be also referred to as the upper-layer counter electrode CT.

The lower-layer counter electrode CTM has a center axis in the running direction substantially aligned with a center axis of the upper-layer counter electrode CT and has a width thereof set smaller than a width of the upper-layer counter electrode CT.

Further, the lower-layer counter electrode CTM is provided with projections CP which are further projected from crests of convex-portion sides at respective bent portions. These projections CP are formed such that the projections CP are extended from the lower-layer counter electrode CTM to an extent that the projections CP are sufficiently projected from the upper-layer counter electrode CT.

The respective lower-layer counter electrodes CTM having the projections CP in this manner are formed on the same layer as the counter voltage signal lines CL and are integrally formed with the counter voltage signal lines CL.

Due to such a constitution, it is possible to decrease the domain which is generated between the counter electrode CT which is arranged substantially at the center of the pixel region and the pixel electrode PX which is arranged close to the counter electrode CT.

Embodiment 3

Figure 3:
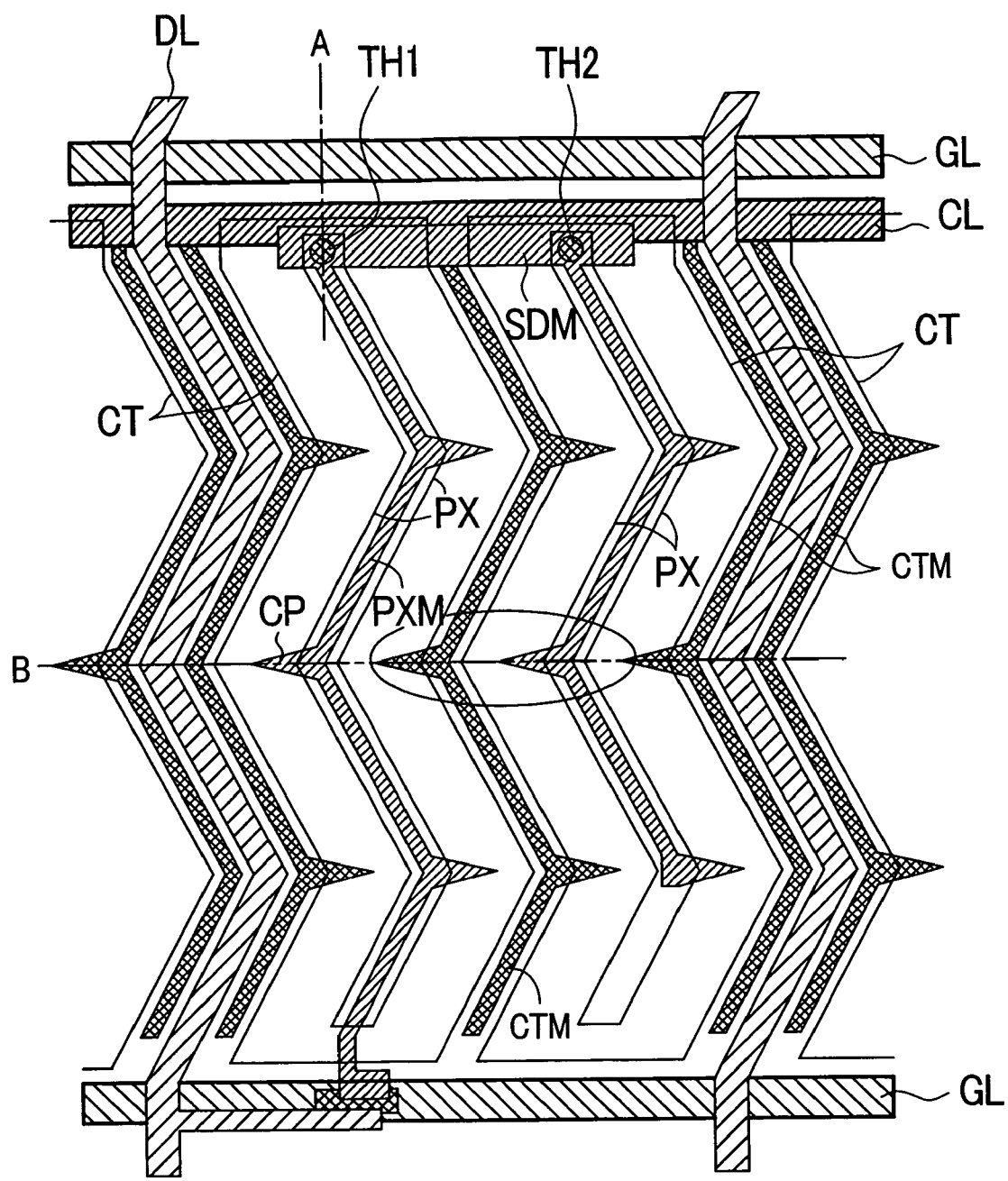
FIG. 3 is a plan view showing another embodiment of a pixel of a liquid crystal display device according to the present invention.

FIG. 3 is a plan view showing another embodiment of the pixel of the liquid crystal display device according to the present invention and corresponds to FIG. 2.

The constitution which makes this embodiment different from the embodiment shown in FIG. 2 lies in that the lower-layer counter electrodes CTM are formed close to the drain signal lines DL. Accordingly, due to the corresponding lower-layer counter electrodes CTM of other neighboring pixel regions in the x direction, the drain signal lines DL are formed in a state that the drain signal line DL is sandwiched between the lower-layer counter electrodes CTM.

Further, these lower-layer counter electrodes CTM are overlapped to the upper-layer counter electrodes CT which are formed over the drain signal lines DL in an overlapped manner, whereby the lower-layer counter electrodes CTM are formed such that they are not projected from the upper-layer counter electrodes CT.

Accordingly, since the drain signal line DL is arranged such that the drain signal line DL is surrounded by the counter electrodes CTM, CT to which the reference voltage is applied in three directions, it is possible to have an advantageous effect that an electric field which generates noises from the drain signal line DL can be substantially completely blocked by shielding.

Further, in this embodiment, the lower-layer counter electrode CTM which is arranged close to the drain signal line DL also includes the projection CP which is further projected from the convex-portion side crest of each bent portion. The projection CP is formed such that the projection CP is extended from the lower-layer counter electrode CTM to an extent that the projection CP is sufficiently projected from the upper-layer counter electrode CT formed over the drain signal line DL in an overlapped manner.

The respective lower-layer counter electrodes CTM having the projections CP in this manner are also formed on the same layer as the counter voltage signal lines CL and are integrally formed with the counter voltage signal lines CL.

Due to such a constitution, it is possible to further decrease the domain which is generated between the counter electrode CT which is overlapped to the drain signal line DL and the pixel electrode PX which is arranged close to the counter electrode CT.

Embodiment 4

For example, in both of the embodiment 2 and embodiment 3, the pixel electrode PX and the counter electrode CT have the two-layered structure interposing an insulation film and, at the same time, the lower pixel electrodes PXM and the lower-layer counter electrodes CTM are formed as different layers by way of an insulation film (insulation film GI).

However, it is possible to form the lower-layer pixel electrode PXM and the lower-layer counter electrode CTM on the same layer. In this case, when the projection CP of one electrode is formed in a further extended manner, there exists a possibility that one electrode is electrically short-circuited with another electrode.

Figure 4A:
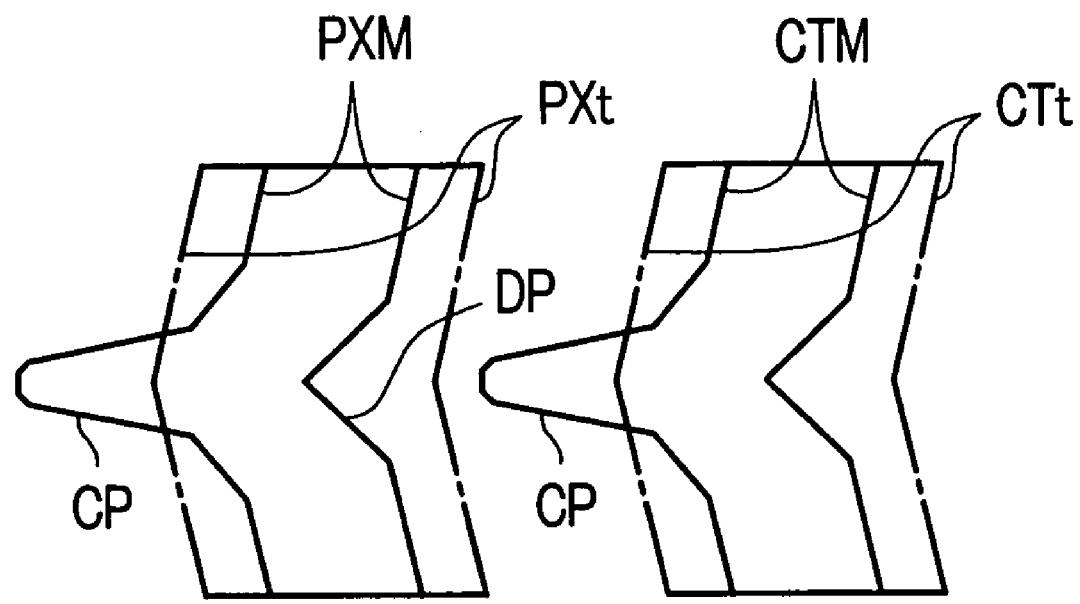
FIG. 4 is a plan view showing one embodiment of pixel electrodes and counter electrodes of a liquid crystal display device according to the present invention.

This embodiment is provided for overcoming such a drawback. That is, for example, FIG. 4A shows the bent portions and the vicinity of the pixel electrode PX and the counter electrode CT which is disposed close to the pixel electrode PX.

The pixel electrode PX has a two-layered structure interposing an insulation film between layers, wherein the pixel electrode PX is constituted of the lower-layer pixel electrode PXM which is disposed below the insulation film and the upper-layer pixel electrode PXt disposed above the insulation film. The counter electrode CT also has a two-layered structure interposing the insulation film between layers, wherein the counter electrode CT is constituted of the lower-layer counter electrode CTM disposed below the insulation film and the upper-layer counter electrode CTt disposed above the insulation film.

The lower-layer pixel electrode PXM and the lower-layer counter electrode CTM have projections CP which are further projected from the convex-portion side crests of respective V-shaped bent portions. Further, in the concave portion of another electrode which faces the projection CT of one electrode in an opposed manner, a notched portion DP is formed such that the notched portion DP further cuts into a bottom of the concave portion of another electrode.

Due to such a constitution at this portion, corresponding to an amount of the notched portion DP formed in the bent portion of each electrode, the spaced-apart distance between respective electrodes becomes large at this portion. Accordingly, even when the projection portion CP of one electrode is further extended as shown in FIG. 4B, for example, a drawback that the extension is electrically short-circuited with another electrode can be obviated.

Figure 4B:
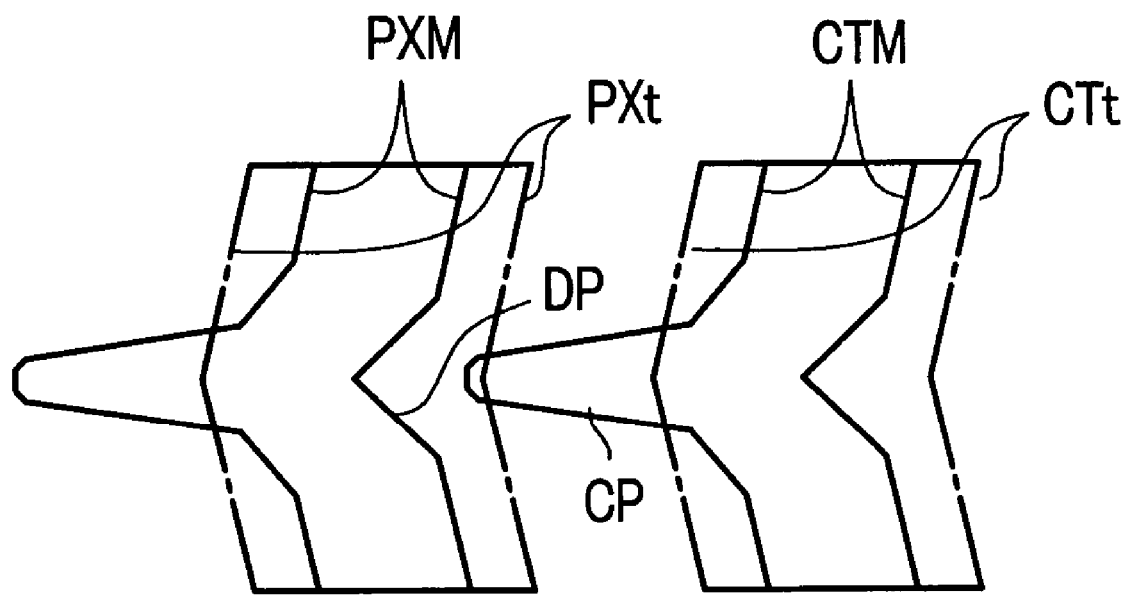

Here, in FIG. 4B, a distal end portion of the projection CP of the lower-layer counter electrode CTM is configured to be overlapped to the upper-layer pixel electrode PXt. Due to such a constitution, it has been confirmed that it is further possible to have an advantageous effect in suppression of the domain region and the enhancement of the numerical aperture of the pixels.

Figure 5A:
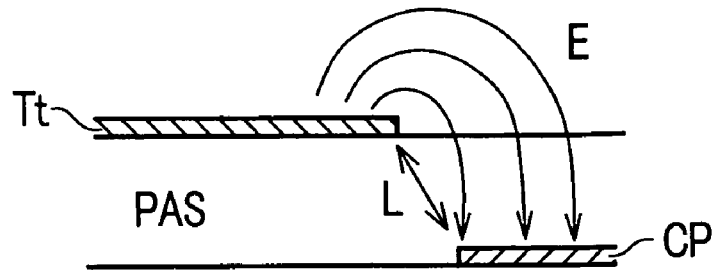
FIG. 5 is an explanatory view for explaining the distribution of an electric field between a pixel electrode and a counter electrode of a liquid crystal display device according to the present invention.
Figure 5B:
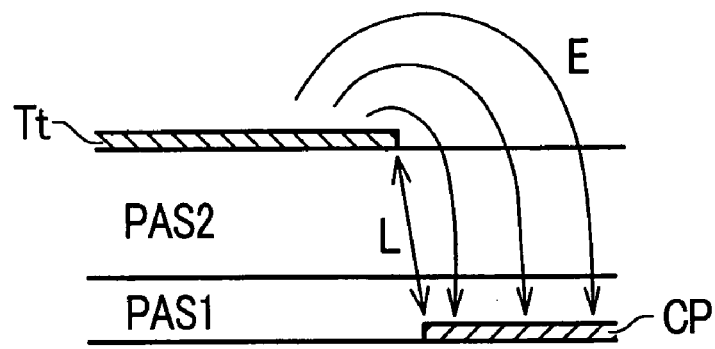
Figure 5C:
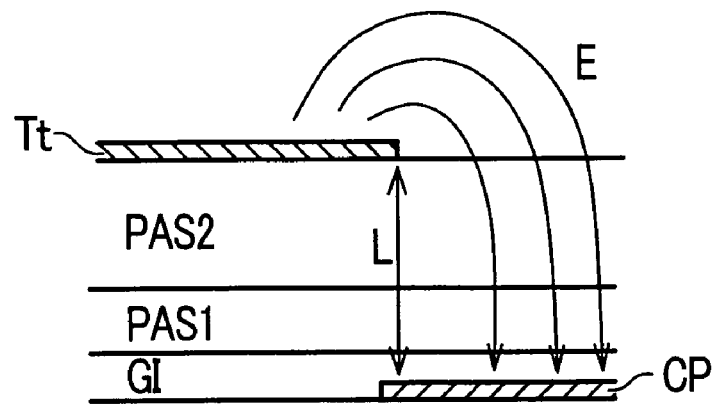

Here, FIG. 5A, FIG. 5B, FIG. 5C are respectively cross-sectional views showing the distribution of an electric field generated between electrodes when the distal end of the projection CP of the lower-layer electrodes which constitutes one electrode approaches considerably to the upper-layer electrode which constitutes another electrode or these electrodes are overlapped to each other.

Here, FIG. 5A shows a case in which between the projection CP of the lower-layer electrode which constitutes one electrode and the upper-layer electrode Tt which constitutes another electrode, the protective film PAS which is made of organic material layer is interposed. FIG. 5B shows a case in which between the projection CP of the lower-layer electrode which constitutes one electrode and the upper-layer electrode Tt which constitutes another electrode, a sequential laminated body consisting of a protective film PAS1 formed of an inorganic material layer and a protective film PAS2 formed of an organic material layer is interposed. FIG. 5C shows a case in which between the projection CP of the lower-layer electrode which constitutes one electrode and the upper-layer electrode Tt which constitutes another electrode, an insulation film GI having a function of a gate insulation film of the thin film transistor TFT and a sequential laminated body consisting of a protective film PAS1 formed of an inorganic material layer and a protective film PAS2 formed of an organic material layer are interposed.

In these drawings, an electric field which is generated between the projection CP of the lower-layer electrode which constitutes one electrode and the upper-layer electrode which constitutes another electrode is referred to a so-called fringe electric field. In the lateral electric field type liquid crystal display device in which, respective electrodes are particularly formed of a light transmitting conductive body, this fringe electric field E can effectively activate the liquid crystal.

Further, it is confirmed that along with the increase of the thickness of the insulation film such as the protective film or the like, the density of the fringe electric field E is decreased. From this phenomenon, it is effective to narrow a distance between the projection CP of the lower-layer electrode which constitutes one electrode and the upper-layer electrode which constitutes another electrode in order of FIG. 5A, FIG. 5B and FIG. 5C.

Figure 6A:
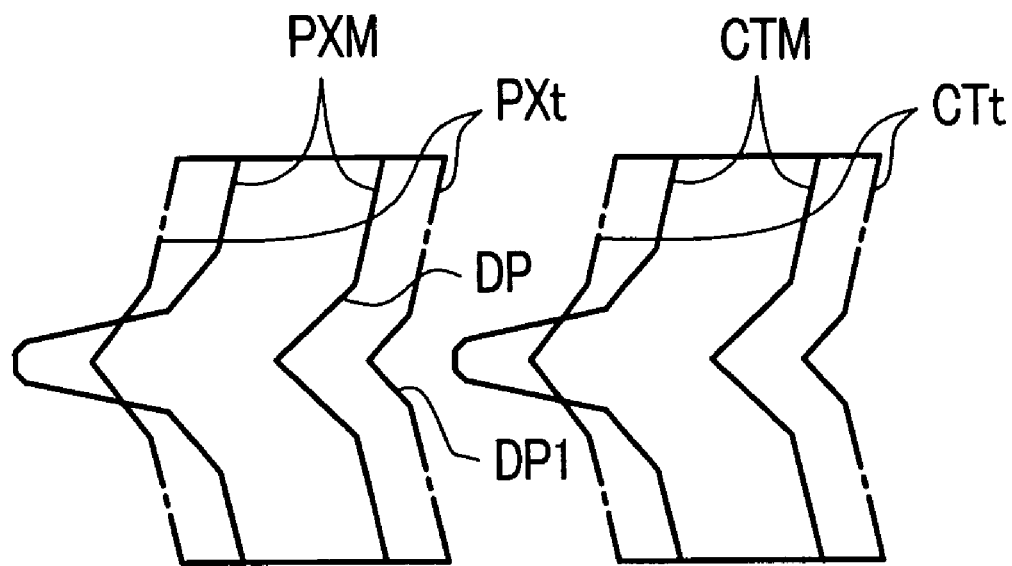
FIG. 6 is a plan view showing another embodiment of pixel electrodes and counter electrodes of a liquid crystal display device according to the present invention.
Figure 6B:
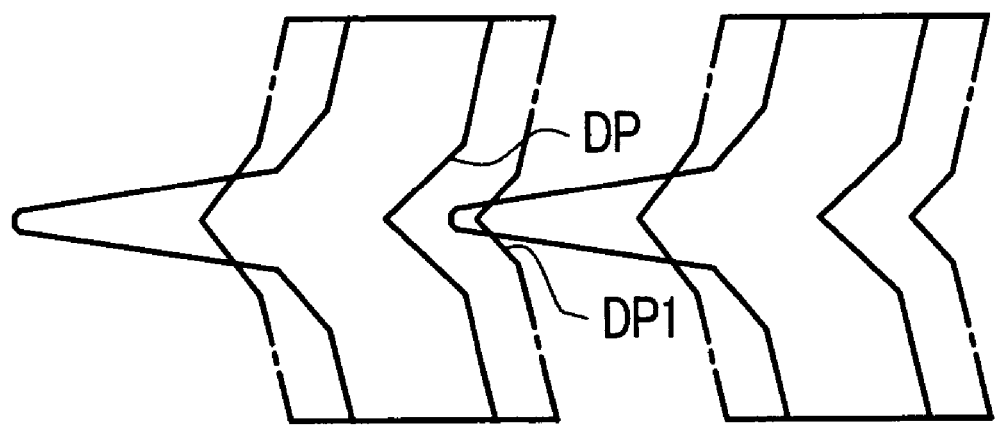

Further, although FIG. 4A and FIG. 4B show the constitution in which the notched portion DP is not formed in the electrode at a side which faces the projection CP and constitutes the upper-layer electrode, it is needless to say that, as shown in the corresponding FIG. 6A and FIG. 6B respectively, a notched portion DP1 having the substantially same shape as the notched portion DP formed in the lower-layer electrode may be formed in the upper-layer electrode PXt or CTt.

Embodiment 5

Figure 7:
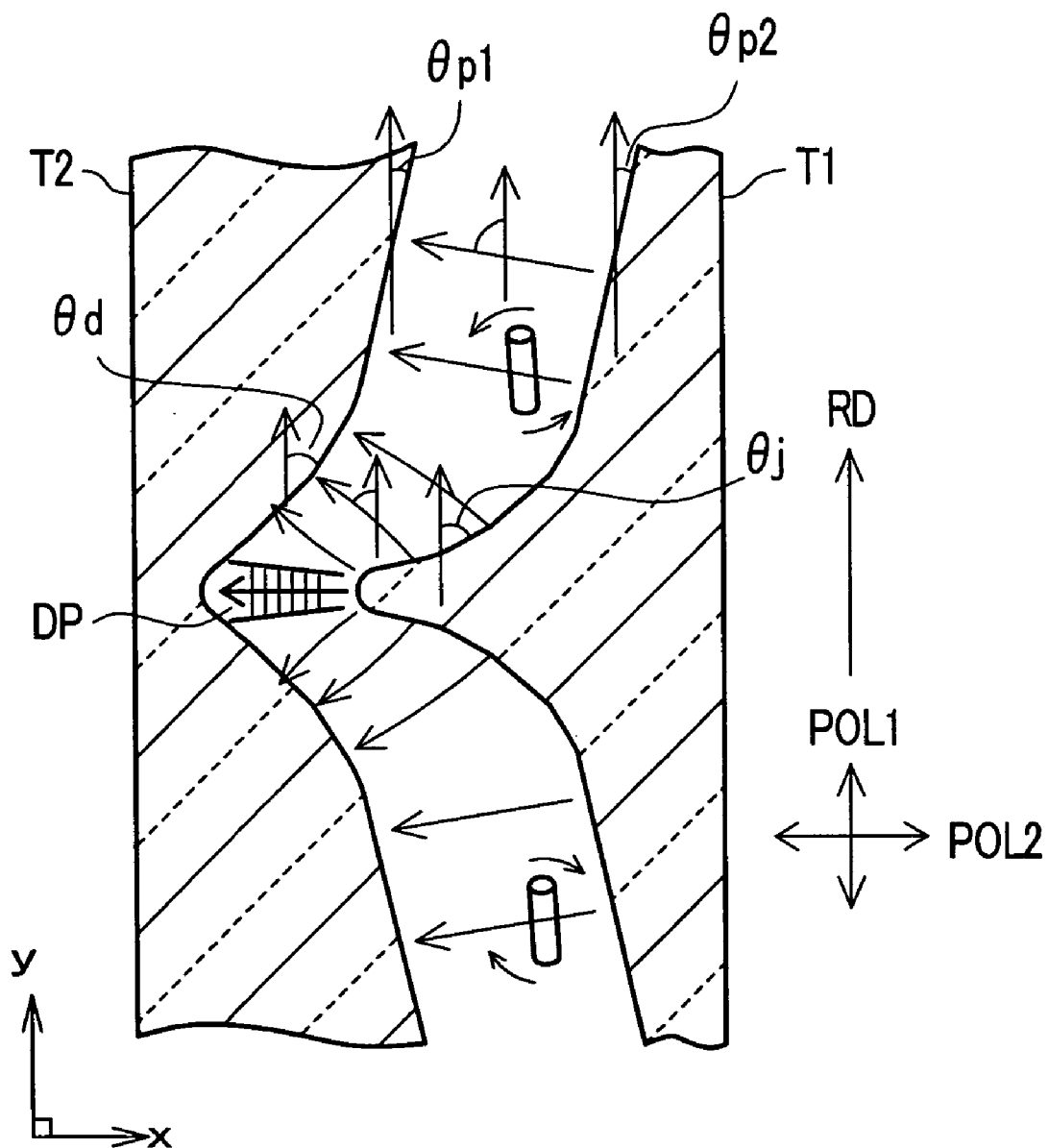
FIG. 7 is a plan view for explaining a pattern of a pair of electrodes which generates an electric field of the liquid crystal display device according to the present invention.

FIG. 7 is a view which shows the more specific constitution of the projection CP of one electrode T1 and the notched portion DP of another electrode T2 at the bent portion with respect to one electrode T1 and another electrode T2 which is disposed close to one electrode T1.

In this case, the rubbing direction RD of the orientation film is aligned in the y direction in the drawing, that is, in the running direction of the drain signal line DL.

In this case, by setting the relationship among inclination angles (angles with respect to the y direction, $\theta p1$, $\theta p1$ in the drawing) of one electrode T1 and another electrode T2, an inclination angle (an angle with respect to the y direction, θj in the drawing) at one side of the projection CP of one electrode T1, an inclination angle (an angle with respect to the y-direction, θd in the drawing) at one side of the projection CP of another electrode T2 as follows, it is confirmed that the further advantage is obtained with respect to the suppression of domain region and the enhancement of numerical aperture of the pixels.

That is, the relationship in which the inclination angles θp1, θp2 are set to a value not less than 5 degree and not more than 20 degree, the inclination angle θj is set to a value not less than 30 degree and not more than 90 degree, the inclination angle θd is set to a value not less than 10 degree and not more than 60 degree, and θp1, θp2<θd≧θj is established.

Accordingly, the direction of the electric field from one electrode T1 to another electrode T2 does not exhibit an acute change in the vicinity of the bent portion and hence, the occurrence of the domain can be drastically decreased.

Figure 25:
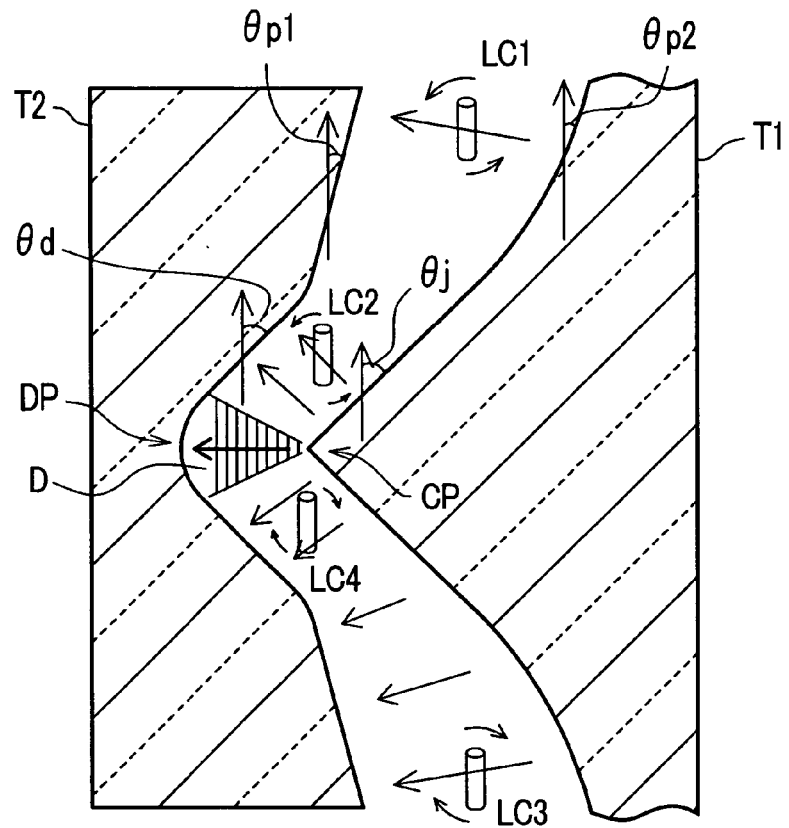
FIG. 25 is a plan view showing another embodiment of respective bent portions of a pixel electrode and a counter electrode of a liquid crystal display device according to the present invention.
Figure 26:
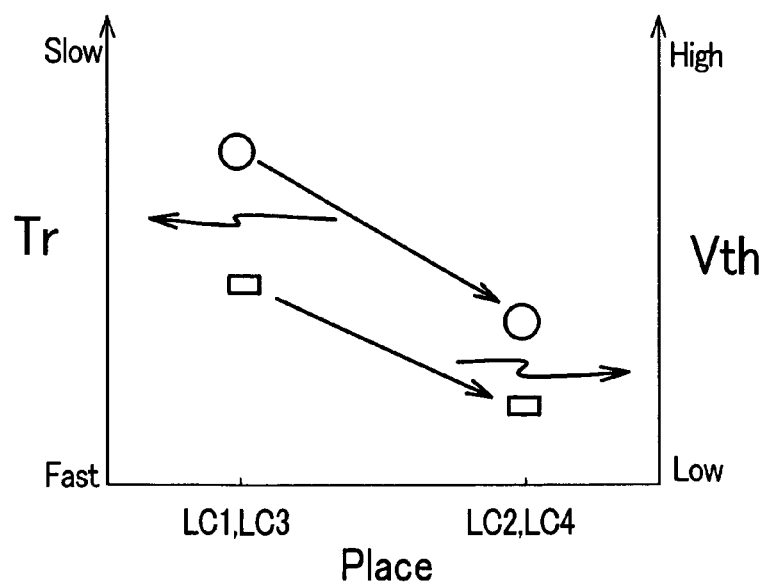
FIG. 26 is a graph showing an advantageous effect derived from the constitution of an electrode shown in FIG. 25.

In such an electrode constitution, using the bent portion as a boundary, a liquid crystal director in regions close to both sides of the bent portion is increased at portions where the angle made by the liquid crystal director and the transmitting axis of the polarizer POL1 assumes ±45°. That is, as described also in Japanese Unexamined Patent Publication 160878/1994 (FIG. 7 in the publication), in the electrode constitution shown in FIG. 25, for example, with respect to a rising response speed Tr and a threshold voltage Vth (the lowest voltage applied between the drive electrodes necessary for moving the liquid crystal molecules) at an intermediate gray scale display of the liquid crystal molecules LC1, LC2 present in a gap between parallel electrodes where the angles θp1 and θp2 are set to θp1=θp2=15°, for example, and an intermediate gray scale display of the liquid crystal molecules LC2, LC4 present in a gap between electrodes where the angles θp1 and θp2 are set to θp1=θp2=45°, both properties are also improved as shown in FIG. 26 as an angle made by the driving electric field and the initial orientation direction (rubbing direction RD) of the liquid crystal approaches 45° from 90° and hence, the liquid crystal director can be easily rotated. In FIG. 26, a place (corresponding to LC1, LC2, LC3, L4 shown in FIG. 25) is taken on an axis of abscissas and a rising response speed Tr with respect to the threshold voltage Vth is taken on an axis of ordinates.

Further, in such a constitution, even when a black display is performed by shifting the driving electric field from an applied state to a non-applied state, on both liquid crystal molecules which are rotatably driven in opposite directions from each other in the vicinity of the bent portion, a resilient force which makes the liquid crystal molecules return to the original orientation state strongly acts and hence, the restoring force derived from the rubbing is added whereby the liquid crystal molecules are rotated faster so as to return to the original orientation state. In this manner, the rising response speed can be improved. In this manner, it is possible to improve the properties of the liquid crystal molecules present in the gap between electrodes in which the main lateral-direction driving electric field is generated and, at the same time, the domain generating region can be formed in a stable manner in manufacturing and hence, the luminance in the vicinity of the bent portion can be made stable.

Figure 27A:
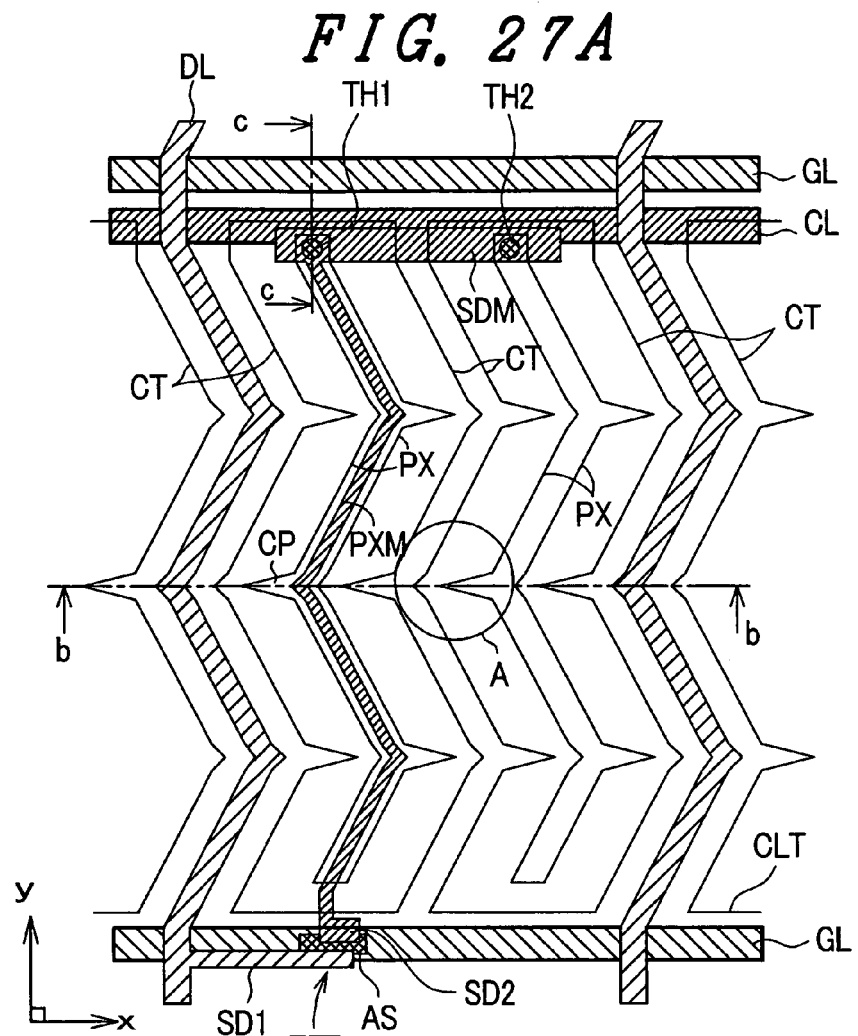
FIG. 27 is a constitutional view for showing another embodiment of a pixel of a liquid crystal display device according to the present invention.
Figure 27B:
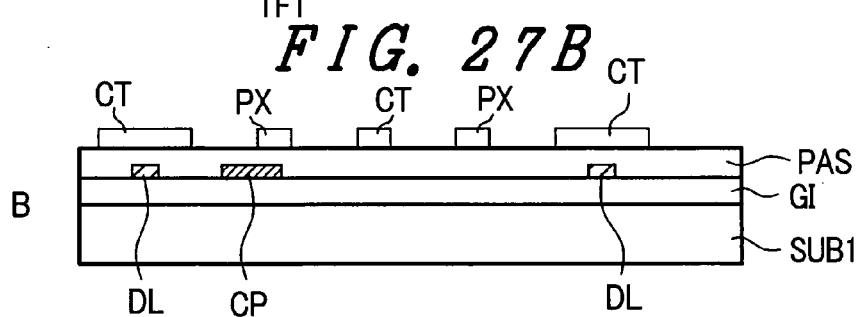
Figure 27C:
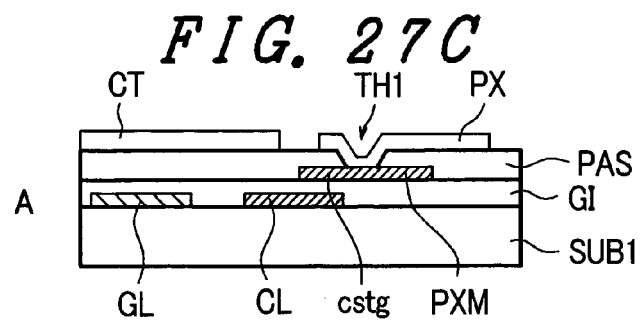

According to the electrode constitution of this embodiment, due to the provision of the notched portion DP, even when the driving electrode which faces the conductive layer in an opposed manner is formed on the same layer, a drawback such as the electric short-circuiting can be eliminated. Accordingly, as shown in FIG. 27, for example, some pixel electrodes PX and some counter electrodes CT may be formed of only a transmitting conductive layer above the protective film PAS. Here, FIG. 27 corresponds to FIG. 1. A position of a portion A in FIG. 27 corresponds to the portion shown in FIG. 7 or FIG. 25.

However, it is needless to say that this embodiment is applicable to a case in which all of the pixel electrodes PX and the counter electrodes CT in the pixel region are respectively formed of one layer.

Further, in the same manner as the constitution on the embodiment 4, when the pixel electrodes PX and the counter electrodes CT are respectively realized by the two-layered structure by way of the insulation layer, it is needless to say that it is sufficient that a periphery of an envelope pattern of two-layered conductive electrodes as viewed in plan satisfies the above-mentioned constitution.

Embodiment 6

Figure 8:
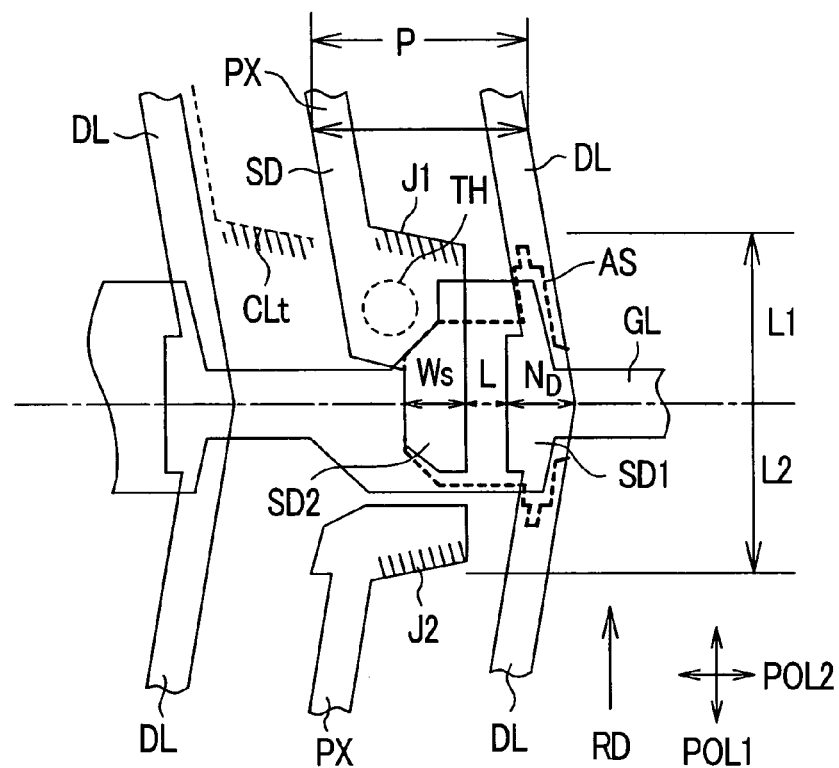
FIG. 8 is a plan view showing one embodiment of a thin film transistor of a liquid crystal display device of the present invention.

FIG. 8 is a plan view showing another embodiment of the pixels of the liquid crystal display device according to the present invention. The drawing shows the detail of the thin film transistor TFT and the vicinity thereof.

In the drawing, the characteristic constitution of this embodiment lies in that the drain signal lines DL which are formed in a zigzag shape as a result of adopting the so-called multi-domain system are arranged such that the gate signal line GL crosses the bent portion of the drain signal line DL and, at the same time, the thin film transistor TFT is arranged over the gate signal line GL at the concave-portion side of the bent portion of the drain signal line DL.

Further, the drain electrode SD1 of the thin film transistor TFT is constituted of a portion of the drain signal line DL, while the source electrode SD2 which constitutes a pair with the drain electrode SD1 is arranged to face the drain electrode SD1 in an opposed manner along the running direction of the gate signal line GL. In other words, a channel length of the thin film transistor TFT is formed such that it is arranged parallel to the running direction of the gate signal lines GL.

Accordingly, the portion of the drain signal line DL which functions as the drain electrode SD1 (portion of the bent portion) is processed such that the portion is arranged parallel in the y direction at the side which faces the source electrode SD2 in an opposed manner and, at the same time, the side of the source electrode SD2 at the drain signal line DL side is formed in parallel to the y direction.

Here, the thin film transistor TFT is positioned within the extensions of the drain signal line DL and the pixel electrode PX close to the drain signal line DL and is set such that assuming the width of the drain electrode SD1 as $N_D$, the channel length as L and the width of the source electrode SD2 as $W_S$, the relationship $P > N_D + L + W_S$ is established. Here, P indicates the distance between outer sides of the drain signal line DL and the pixel electrode PX.

The pixel having such a constitution can, first of all, effectively prevent the domain which is liable to easily occur in the vicinity of the gate signal line GL. At the same time, the pattern of the source electrode SD2 of the thin film transistor TFT and the vicinity portion of the pixel electrode PX which is connected to the source electrode SD2 can be simplified. Further, it is possible to prevent the short-circuiting of the pixel electrode PX with other electrode with high probability.

That is, in the drawing, the occurrence of the domain in the pixel region at the left side in the drawing with respect to the pixel electrode PX is obviated using the counter voltage signal line CLt, while the occurrence of the domain in the pixel region at the right side in the drawing is obviated using the extension J1 of the pixel electrode PX.

In this case, the extension J1 of the pixel electrode PX can make the region defined between the pixel electrode PX and the source electrode SD2 extend to the center side of the pixel region whereby the occurrence of domain can be suppressed. It is needless to say that a geometric shape of the extension J1 of the pixel electrode PX is set such that the direction of the electric field generated between the extension J1 and the counter electrode CT arranged close to the extension J1 is defined without being largely different from the direction of the normal electric field.

This implies that in the vicinity of the thin film transistor TFT where the respective members are arranged in a relatively complicated manner, the pattern of the pixel electrode PX in the vicinity of the source electrode SD2 can be simplified and hence, the fear of occurrence of short-circuiting between the pixel electrode PX with other conductive layer on the same layer can be eliminated.

Here, the geometric shape of the counter voltage signal line CLt for obviating the occurrence of domain in the pixel region at the left side of the drawing with respect to the pixel electrode, since the counter voltage signal line CLt is formed on the protective film PAS, also provides a spatial margin and hence, it gives rise to no serious problem compared to the pattern of the pixel electrode PX in the vicinity of the source electrode SD2. Further, as shown in FIG. 8, places where the through holes TH which connect the source electrode SD2 and the upper-layer pixel electrode PXt are formed can be arranged between the extension J1 and the gate signal line GL and hence, it is possible to solve the drawback that the numerical aperture is lowered due to the occurrence of domain in the vicinity of these places.

Figure 9:
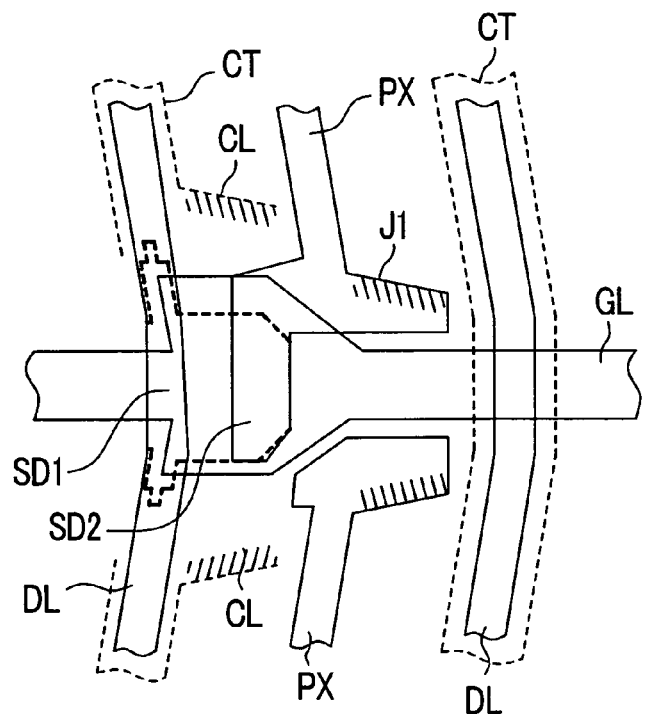
FIG. 9 is a comparison view for showing an advantageous effect of a thin film transistor of a liquid crystal display device of the present invention.

Here, FIG. 9 is an explanatory view which is drawn by taking a case in which the thin film transistor TFT is formed on the convex-portion side of the bent portion of the drain signal line DL into consideration. Here, FIG. 9 is depicted such that the position of the thin film transistor TFT is changed using the constitution of the drain signal line DL and the pixel electrode PX shown in FIG. 8 as the reference.

Accordingly, in FIG. 9, in the same manner as FIG. 8, the occurrence of domain can be obviated by the counter voltage signal line CL at the left-side pixel region in the drawing with respect to the pixel electrode PX, while the occurrence of domain can be obviated by the extension J1 of the pixel electrode PX at the right-side pixel region in the drawing.

As can be clearly understood from FIG. 9, the extension J1 of the pixel electrode PX for obviating the domain at the right-side pixel region in the drawing with respect to the pixel electrode PX must be extended to an extent such that the extension J1 is arranged close to the right-side drain signal line DL and hence, the extension J1 must be arranged close to the gate signal line GL.

It is needless to say that the geometric shape of the extension J1 in this case is determined on the premise that the direction of the electric field generated between the extension J1 and the counter electrode CT which is arranged close to the extension J1 is set without being largely different from the direction of the normal electric field.

Here, the geometric shape of the counter voltage signal line CLt for obviating the occurrence of domain at the left-side pixel region in the drawing with respect to the pixel electrode PX is substantially equal to the geometric shape shown in FIG. 8.

Further, by adopting the constitution shown in FIG. 8, it is also possible to enhance the so-called numerical aperture of the pixel simultaneously.

Figure 10A:
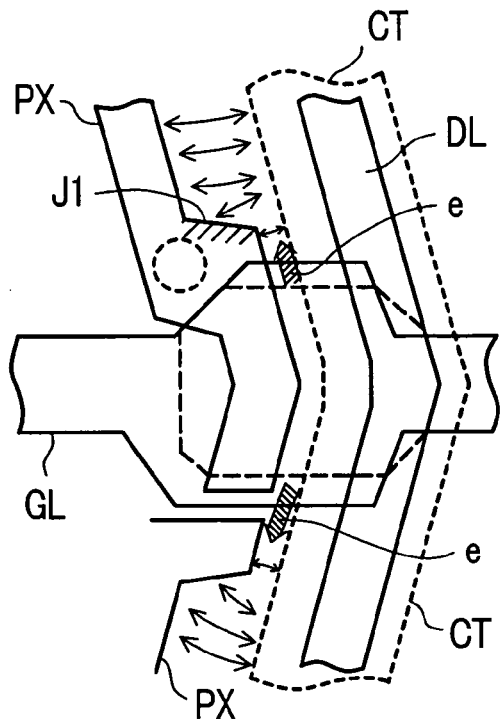
FIG. 10 is an explanatory view for exhibiting advantageous effects of a liquid crystal display device according to the present invention.

That is, FIG. 10A is an explanatory view showing the pixel region defined between the pixel electrode PX which is connected to the source electrode SD2 of the thin film transistor TFT and the drain signal line DL which is connected to the drain electrode SD1 of the thin film transistor TFT.

Due to the presence of the extension J1 in the vicinity of the connection portion between the pixel electrode PX and the source electrode SD2, electric field noises e (indicated by bold-line arrows in the drawing) from the gate signal line GL can hardly intrude the pixel region. That is, the extension J1 is formed such that the extension J1 extends to an extent that the extension J1 is arranged substantially close to the counter electrode CT which is overlapped to the drain signal line DL, whereby an intrusion path of the electric field noises e is narrowed.

Figure 10B:
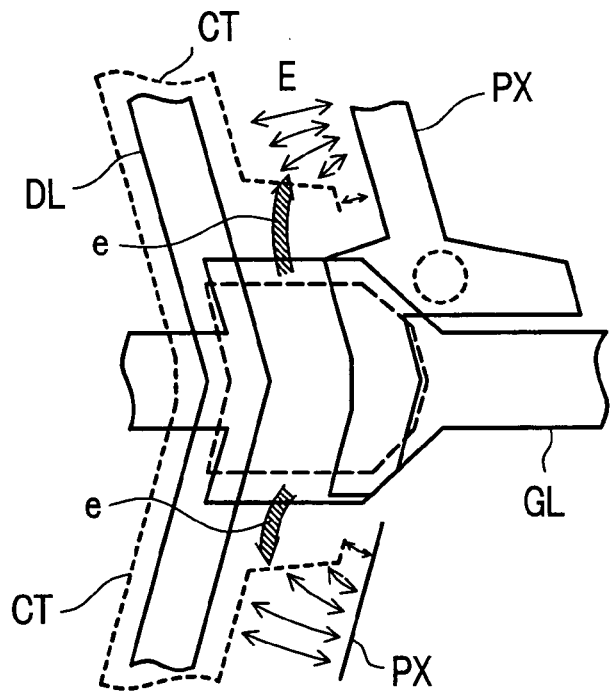

Here, FIG. 10B shows a case in which the thin film transistor TFT is arranged at the convex-portion side of the bent portion of the drain signal line DL. That is, FIG. 10B is an explanatory view which shows the pixel region defined between the pixel electrode PX which is connected to the source electrode SD2 of the thin film transistor TFT and the drain signal line DL which is connected to the drain electrode SD1 of the thin film transistor TFT.

Although, as mentioned previously, the occurrence of domain in the pixel region at such a portion is obviated by the counter voltage signal line CLt which sufficiently covers the gate signal line GL, to effectively prevent the electric field noises e from the gate signal line GL, it is necessary to relatively largely increase a width of the counter voltage signal line CLt at this portion.

This is because a thickness of the protective film PAS on which the counter voltage signal line CLt is formed is relatively large and hence, to effectively obviate the electric field noises e from the gate signal line GL, it is necessary to increase the width of the counter voltage signal line CLt correspondingly.

In this manner, it is possible to obtain the above-mentioned respective advantageous effects by arranging the thin film transistor TFT to the concave-portion side of the bent portion of the drain signal line DL. Accordingly, in this embodiment, by forming the bent portion of the drain signal line DL also substantially at the center portion of the pixel region, it is possible to form the bent portion having the concave portion in the same direction at the portion where each drain signal line DL crosses the gate signal line GL.

Accordingly, it is possible to arrange the thin film transistors TFT at the same corresponding places in respective pixels.

Embodiment 7

Figure 11:
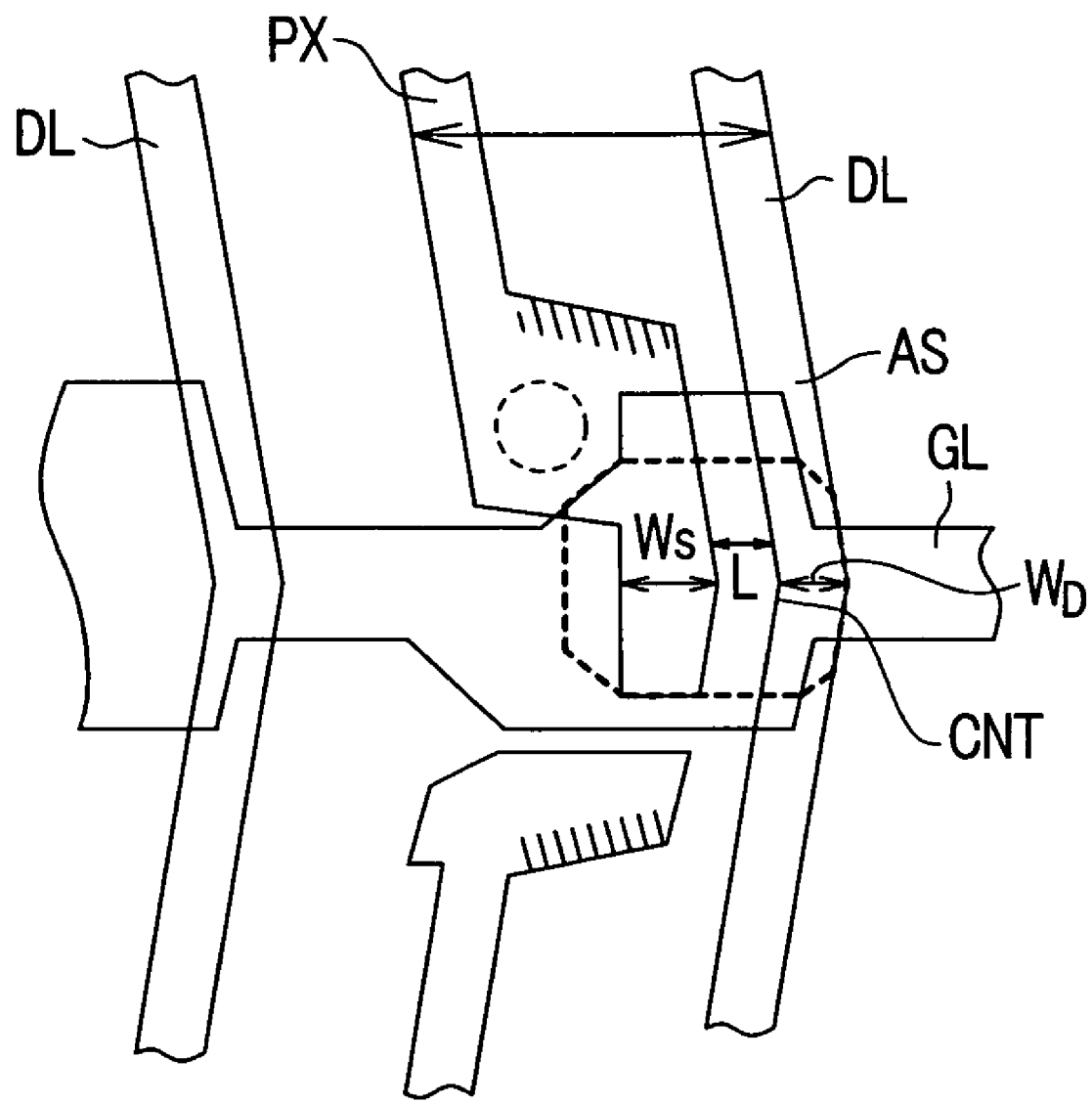
FIG. 11 is a plan view showing another embodiment of a thin film transistor of a liquid crystal display device of the present invention.

FIG. 11 is a plan view showing another embodiment of the pixel of the liquid crystal display device according to the present invention and corresponds to FIG. 8.

The constitution which makes this embodiment different from the embodiment shown in FIG. 8 lies in the constitution of the drain electrode SD1 and the source electrode SD2 of the thin film transistor TFT.

First feature lies in that with respect to the drain electrode SD1, a portion of the drain signal line DL is used as the drain electrode of the thin film transistor TFT in its original form.

That is, the drain signal line DL is formed in a "L-shaped" pattern having the bent portions at portions thereof where the drain signal line DL crosses the gate signal line GL. These bent portions and the vicinity thereof are used as the drain electrodes SD1 without processing them at all. However, the vicinity CNT of the center portion of the bent portion is partially arranged in parallel in the y direction to set the channel length L to a fixed value.

On the other hand, the source electrode SD2 of the thin film transistor TFT is formed such that the side of the source electrode SD2 which faces the drain electrode SD1 is formed in a shape which is formed by shifting the side of the drain electrode SD1 which faces the source electrode SD2 in the x direction.

Due to such a constitution, the channel region between the drain electrode SD1 and the source electrode SD2 is formed in an "L-shaped" pattern having bent portions so that the channel width can be increased.

Figure 12A:
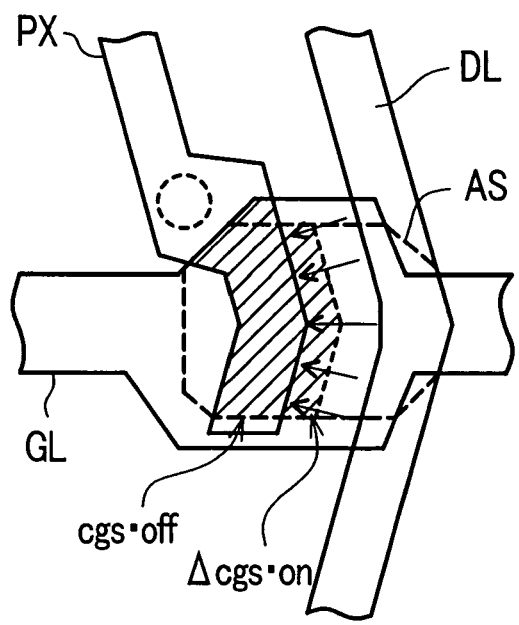
FIG. 12 is an explanatory view for explaining advantageous effects of a thin film transistor of a liquid crystal display device according to the present invention.

Further, when the thin film transistor TFT is arranged at the concave-portion side of the bent portion of the drain signal line DL and the channel region is formed in an "L shape", the directions of electric currents which flow inside the channel region are directed in the direction that the electric currents are converged to each other as shown in FIG. 12A. This implies that an area of the source electrode SD2 which is overlapped to the gate signal line GL can be reduced.

Accordingly, this embodiment gives rise to an advantageous effect that the capacitance Cgs between the gate electrode SD1 and the source electrode SD2 of the thin film transistor TFT can be reduced.

Figure 12B:
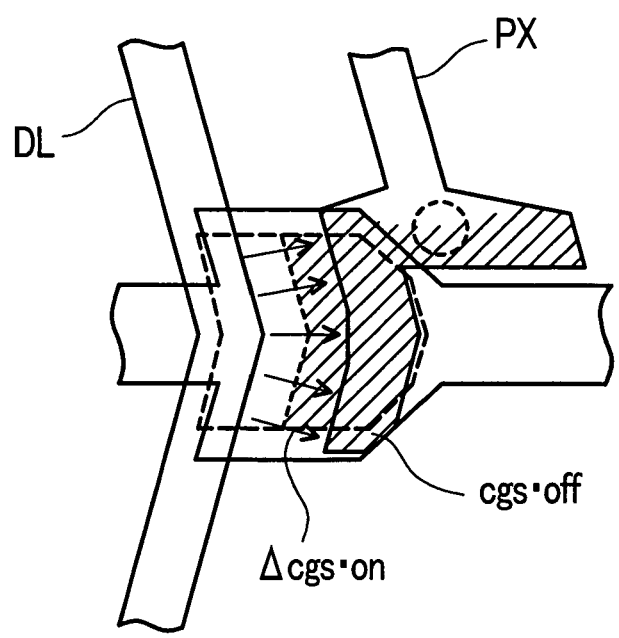

On the other hand, in FIG. 12B, a case in which the thin film transistor TFT is arranged at the convex-portion side of the bent portion of the drain signal line DL is taken into consideration. In this case, the directions of electric currents which flow inside the channel region of the thin film transistor TFT are directed in the direction that the electric currents are diffused. As a result, it is necessary to increase the source electrode SD2 so that there is no other way but to increase the capacitance Cgs.

Further, as described above, in the vicinity of the source electrode SD2 of the thin film transistor TFT of the pixel electrode PX, it is necessary to form the extension which blocks the electric field noises from the gate signal lines GL by shielding and hence, the state in which the capacitance Cgs between the extension and the gate signal line GL is further added.

Here, in FIG. 12A and FIG. 12B, ΔCgs·off, ΔCgs·on respectively indicate a region to which the capacitance Cgs which is generated when the thin film transistor TFT is switched off contributes and a region to which the capacitance Cgs which is generated when the thin film transistor TFT is switched on contributes.

Embodiment 8

Figure 13:
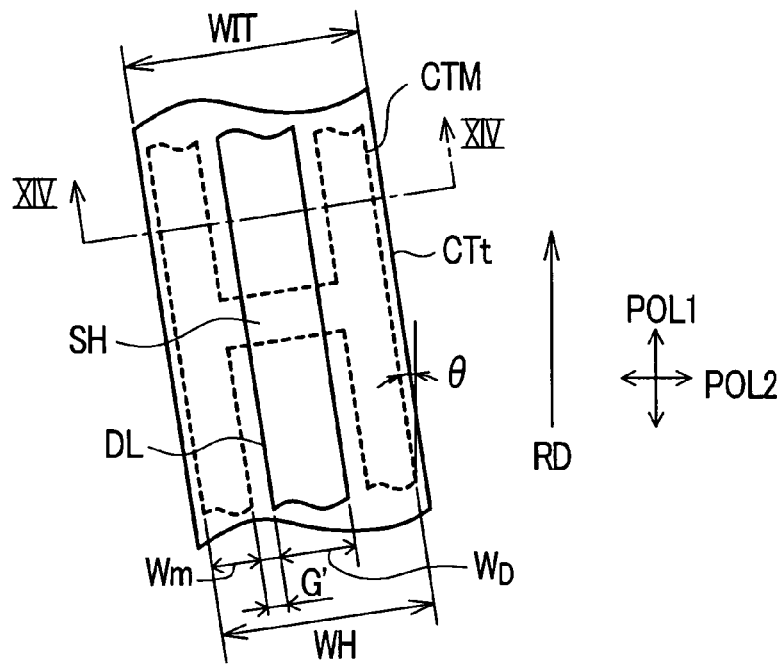
FIG. 13 is a plan view for showing one embodiment of the constitution of drain signal lines and the vicinity of the drain signal lines of a liquid crystal display device according to the present invention.

FIG. 13 is a plan view showing another embodiment of the liquid crystal display device according to the present invention. Further, FIG. 14 is a cross-sectional view taken along a line XIV—XIV in FIG. 13.

FIG. 13 shows the drain signal line DL, the counter electrodes CTM which are arranged at both sides of the drain signal line DL and the counter electrode CT which is formed of a light-transmitting conductive layer which is arranged in an overlapped manner with the drain signal line DL and the counter electrodes CTM.

Figure 14:
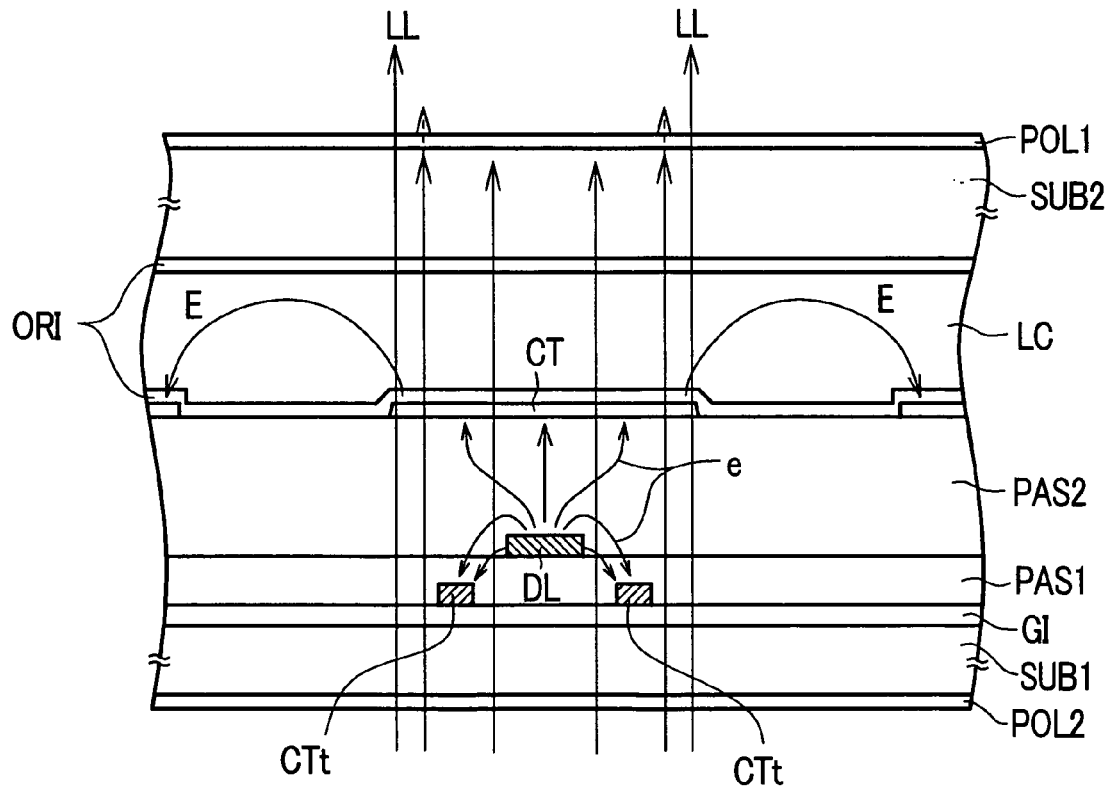
FIG. 14 is a cross-sectional view taken along a line XIV—XIV in FIG. 13.

Due to such a constitution, as shown in FIG. 14, it is possible to provide the constitution in which the electric field (electric field noises e) from the drain signal line DL is terminated to the counter electrodes CT which are arranged at both sides of the drain signal line DL and the counter electrode CT which is formed above the drain signal line DL, while the electric field (electric field noises e) is not terminated to the pixel electrode PX arranged close to the drain signal line DL.

Further, according this embodiment, the drain signal line DL and the counter electrodes CTM which are arranged at both sides of the drain signal line DL are formed at different layers by way of the insulation film and, at the same time, the respective counter electrodes CTM which are arranged at both sides of the drain signal line DL are electrically connected to each other by connectors SH which cross the drain signal line DL at a given interval in the running direction thereof thus forming a so-called ladder-like pattern.

Respective widths Wm of the counter electrodes CTM are substantially determined based on the width WD of the drain signal line DL and the width WIT of the counter electrode CT and are usually narrower than the widths of other electrodes.

Accordingly, to prevent the disconnection of the counter electrodes CTM, the counter electrodes CTM are formed in the ladder pattern. Accordingly, even when one counter electrode CTM is disconnected, the signal can be supplied to a distal terminal of one counter electrode CTM through one of connectors which are formed with the disconnected portion interposed therebetween, the other counter electrode CTM and another connector. Due to such a constitution, it is effective to arrange the above-mentioned connectors SH with a relatively narrow distance between the connector SH and the neighboring another connector SH.

Here, although the connector SH has also a function of supplying the reference signal to the counter electrode CT of the neighboring pixel region, the connector SH is mainly constituted to solve the drawback attributed to the disconnection of the counter electrode CTM. This is because the counter electrode CTM is configured to have at least one end thereof connected to the counter voltage signal line CL for supplying the reference signal to the counter electrode CT of the neighboring pixel region.

Embodiment 9

Figure 15:
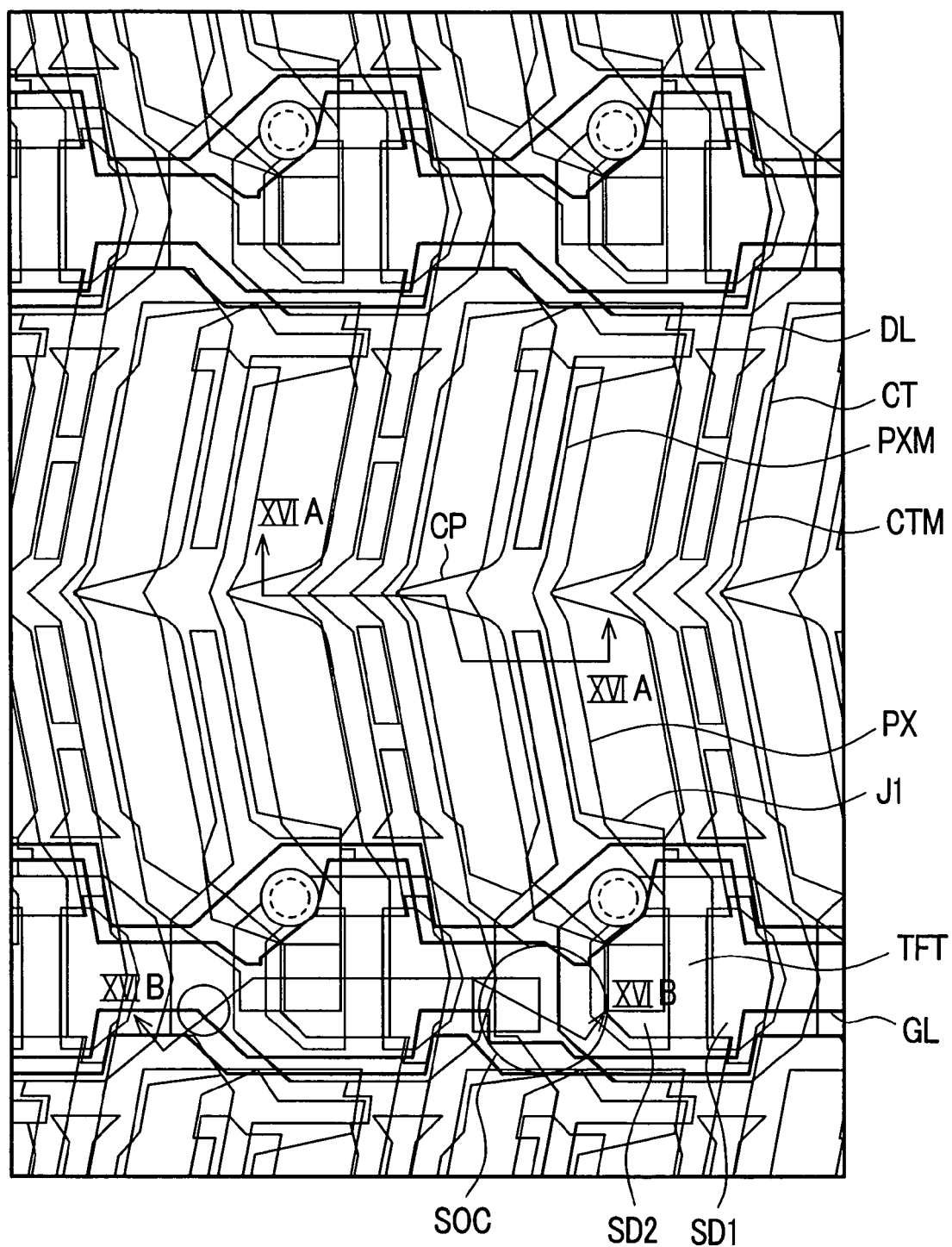
FIG. 15 is a plan view showing another embodiment of a pixel of a liquid crystal display device according to the present invention.
Figure 16A:
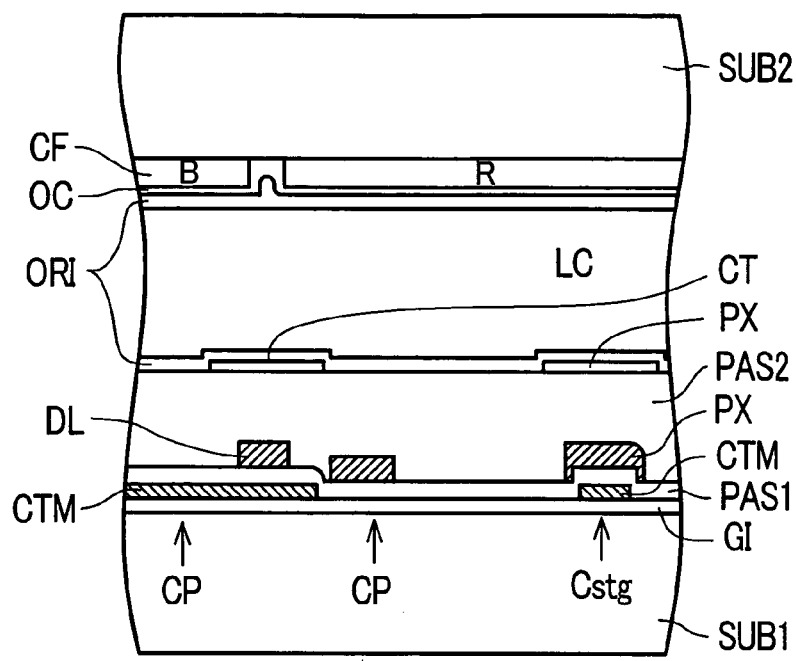
FIG. 16 is a cross-sectional view taken along a line XVI—XVI in FIG. 15.
Figure 16B:
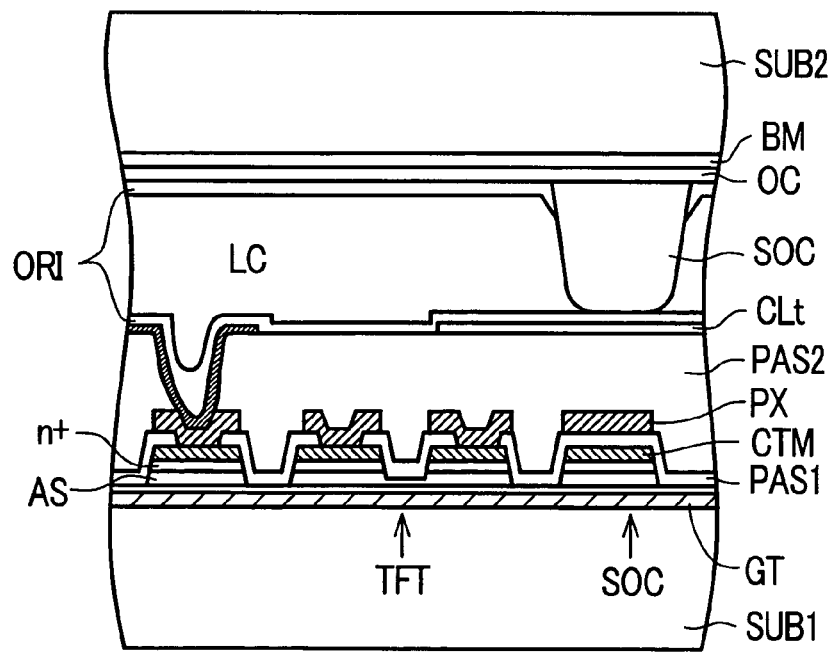

FIG. 15 is a plan view showing one embodiment when the above-mentioned respective embodiments are applied to the pixel region of the liquid crystal display device. Further, FIG. 16A is a cross-sectional view taken along a line XVIA—XVIA in FIG. 15 and FIG. 16B is a cross-sectional view taken along a line XVIB—XVIB in FIG. 15.

In this embodiment, one pixel includes one pixel electrode PX and two counter electrodes CT respectively arranged at the both sides of the pixel electrode PX. The lower-layer pixel electrode PXM is arranged below the pixel electrode PX and the lower-layer counter electrodes CTM are arranged below the counter electrodes CT. The lower-layer counter electrodes CTM are formed at both sides of the drain signal line DL on the layer different from the layer of the drain signal line DL by way of an insulation film. Further, the lower-layer counter electrodes CTM have portions thereof connected with each other by means of the connection portions SH which are arranged to cross the drain signal line DL.

Further, the drain signal line DL has a zigzag shape having bent portions at portions where the drain signal lines DL cross the gate signal lines GL and the approximately center of the pixel region. A thin film transistor TFT which is arranged on the gate signal line GL is arranged close to the concave-portion side of the bent portion of the drain signal line DL.

Further, in FIG. 15, members indicated by SOC are so-called columnar spacers. As shown in FIG. 16B, the columnar spacers SOC are spacers which are made of resin, for example, and are formed on the liquid-crystal-side surface of the transparent substrate SUB2. Due to these columnar spacers, a layer thickness of the liquid crystal is maintained uniform.

This columnar spacers SOC are formed on an upper surface of the black matrix BM and a leveling film OC which are sequentially formed on the surface of the transparent substrate SUB2.

The respective steps of one embodiment of the manufacturing method of the liquid crystal display device having such a constitution are explained hereinafter in conjunction with FIG. 17 to FIG. 23. Here, a photolithography method is performed once in each step shown in each drawing and hence, the pixel regions of the transparent substrate SUB1 side can be formed by performing the photolithography method seven times in total.

Figure 17:
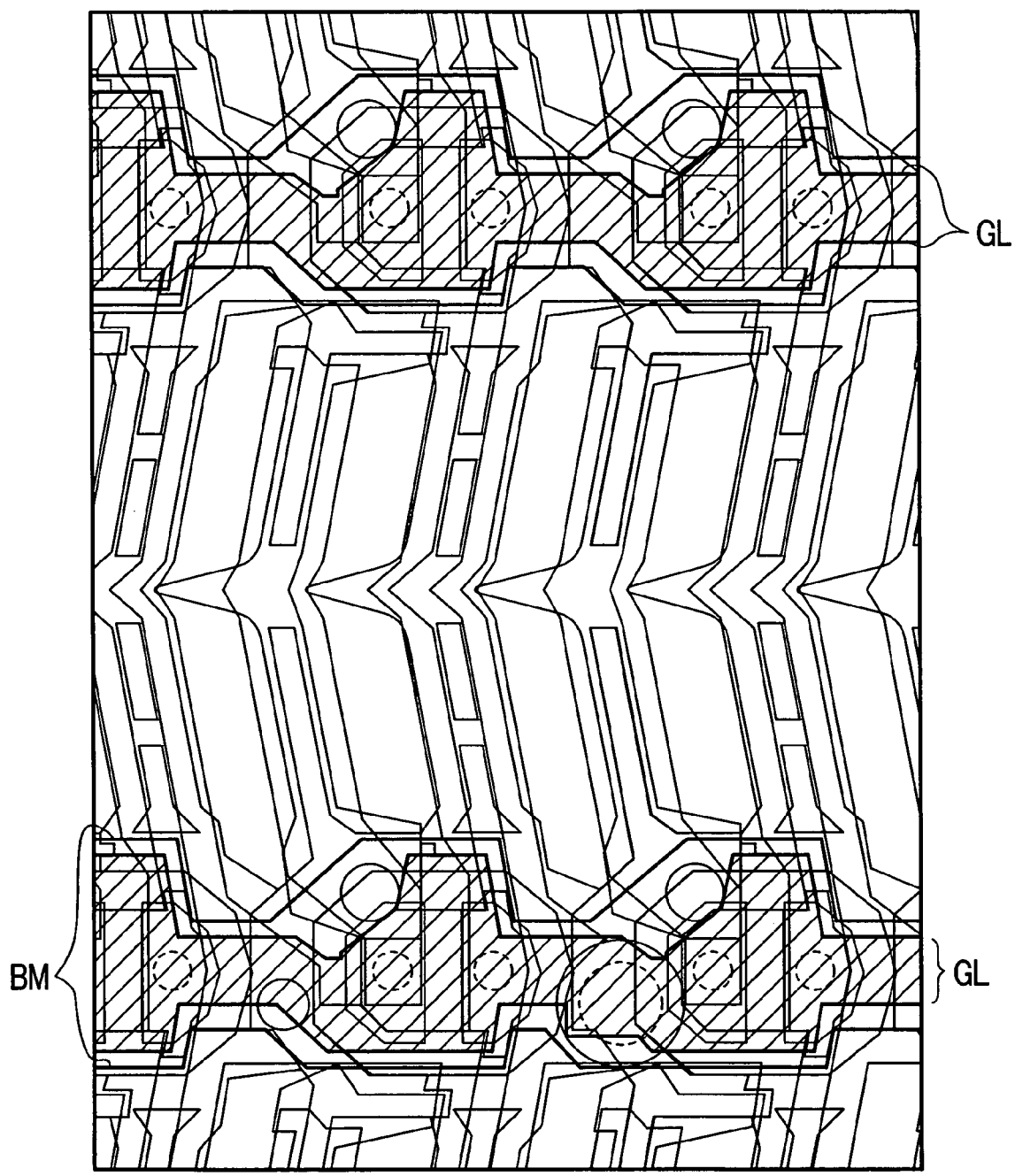
FIG. 17 is a plan view showing the first step out of steps for showing one embodiment of a manufacturing method of a liquid crystal display device according to the present invention.

Step 1. (FIG. 17)

First, the gate signal lines GL are formed on the liquid crystal-side surface of the transparent substrate SUB1. As the material of this gate signal line GL, for example, a laminated body which is formed by laminating a Mo—Cr layer or a Mo—Zr layer having a thickness of approximately 60 nm to the Al—Nd layer having a thickness of approximately 250 nm is used.

In addition, it is needless to say that the gate signal line GL may have a so-called anodized film formed on the surface thereof.

Thereafter, an insulation film GI is formed over the transparent substrate SUB1 such that the insulation film GI also cover the gate signal line GL. This insulation film GI becomes a gate insulation film of the thin film transistor TFT and hence, a film thickness of the insulation film GI is set to have the function as a gate insulation film. As the material of the insulation film GI, for example, a silicon nitride film (SiN) having a thickness of approximately 350 nm is used.

Further, an amorphous silicon (a-Si) layer AS having a thickness of approximately 200 nm is formed on a surface of the insulation film GI and a highly concentrated N$^+$ impurity layer is formed on a surface of the amorphous silicon layer AS by doping the surface with phosphorous.

In addition, by sequentially forming the insulation film GI and the amorphous silicon (a-Si) layer AS collectively using a same bell jar by a CVD method, for example, the step can be performed reliably while preventing the intrusion of impurities.

Figure 18:
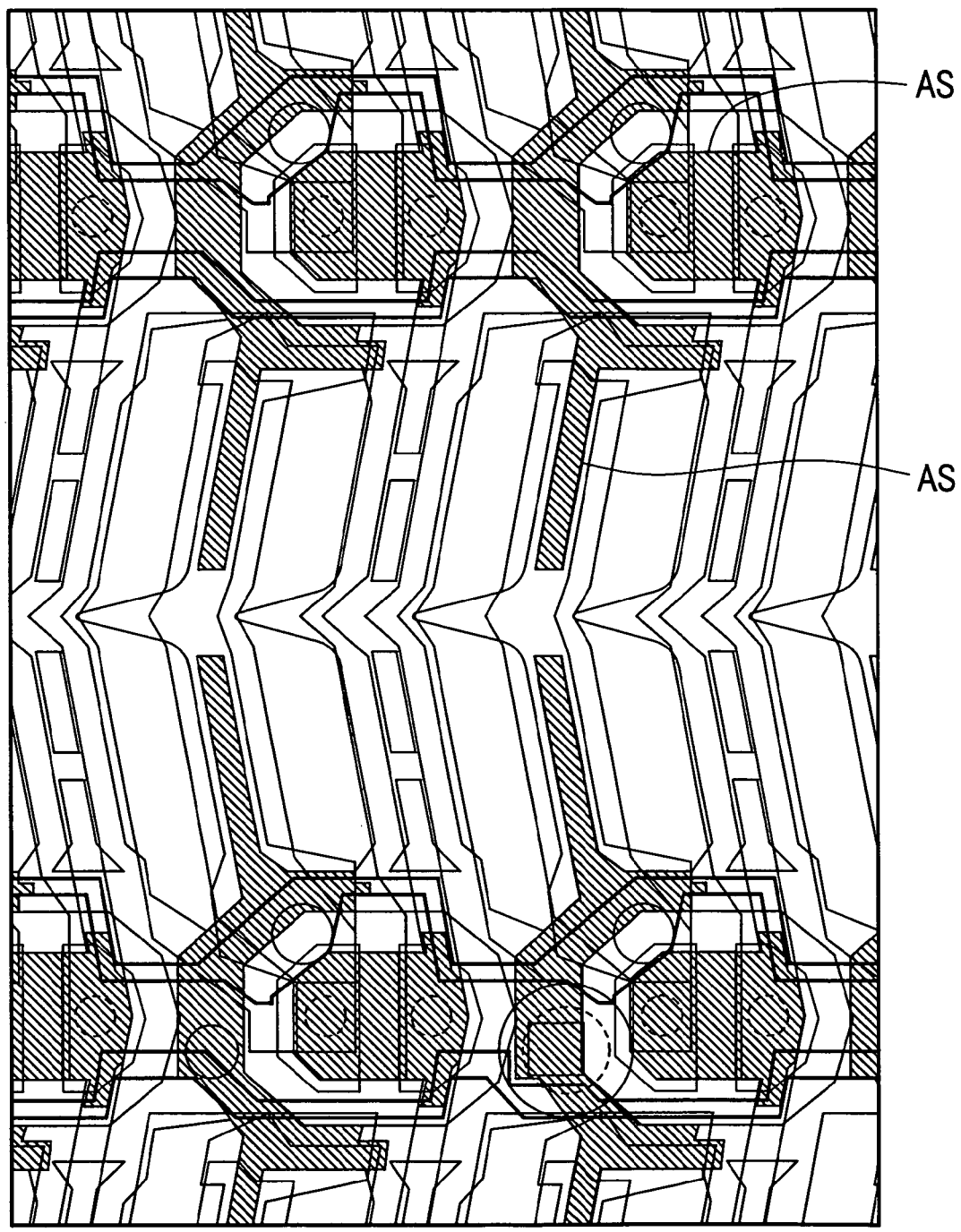
FIG. 18 is a plan view showing the second step out of steps for showing one embodiment of a manufacturing method of a liquid crystal display device according to the present invention.

Step 2 (FIG. 18)

Then, the amorphous silicon layer AS is formed in a given pattern. Here, the amorphous silicon layer AS is made to remain not only in the region for forming the thin film transistor TFT but also in the region for forming the pixel electrode PX. This provision is for preventing breaking of the pixel electrode PX which is formed later due to a stepped portion.

Figure 19:
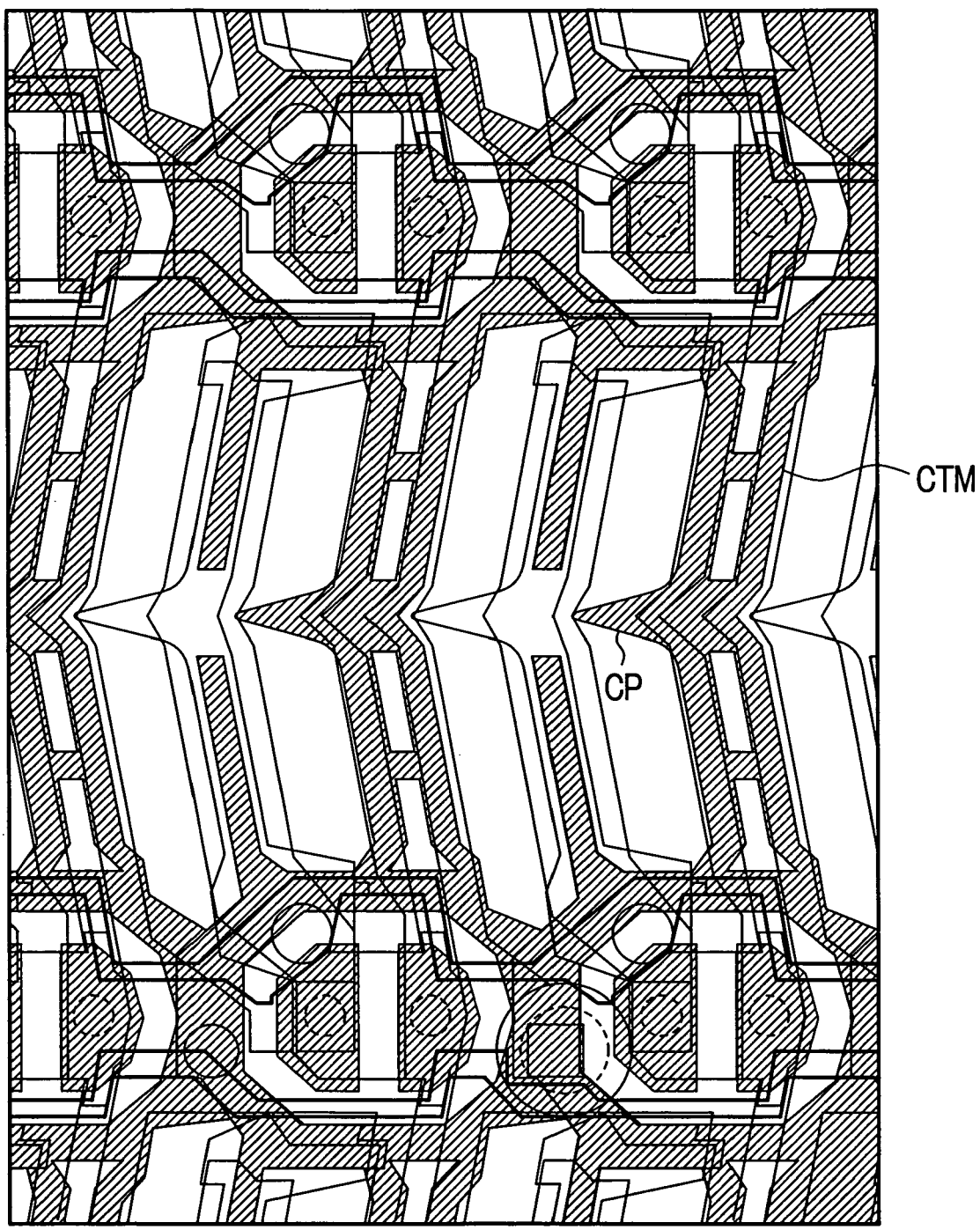
FIG. 19 is a plan view showing the third step out of steps for showing one embodiment of a manufacturing method of a liquid crystal display device according to the present invention.

Step 3. (FIG. 19)

Next, the counter voltage signal lines CL, the counter electrodes CTM connected to the counter voltage signal lines CL, the drain electrodes SD1 and the source electrodes SD2 of the thin transistors TFT are formed. As the materials of the counter voltage signal lines CL, the counter electrodes CT, the drain electrodes SD1 and the source electrodes SD2, for example, any one of Mo—Cr, Mo—Zr, Ta, Ti, Cr and the like can be used. With regard to the film thickness of the counter voltage signal line CL, the counter electrode CT, the drain electrode SD1 and the source electrode SD2, it is appropriate to set the film thickness to about 120 nm.

Using the drain electrode SD1 and the source electrode SD2 of the thin film transistor TFT as masks, the N-type impurity layer on an upper surface of the amorphous silicon layer AS which is exposed from the masks is removed by etching.

Then, the protective film PAS1 is formed on a surface of the transparent substrate SUB1 such that the protective film PAS1 also covers the counter voltage signal lines CL and the counter electrodes CTM. As the material of the protective film PAS1, a silicon nitride film (SiN) is used, for example, and the appropriate film thickness is about 200 nm.

Figure 20:
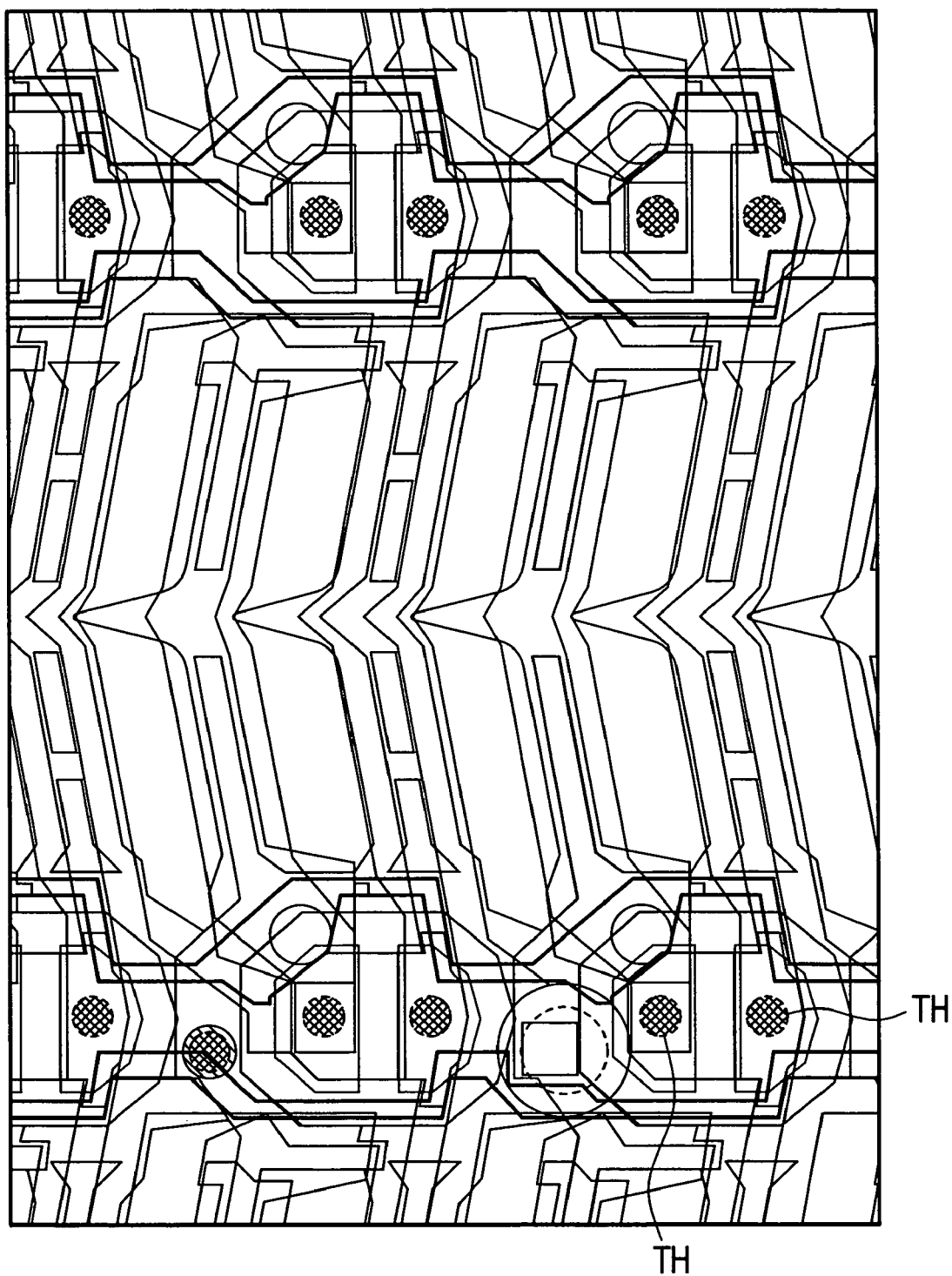
FIG. 20 is a plan view showing the fourth step out of steps for showing one embodiment of a manufacturing method of a liquid crystal display device according to the present invention.

Step 4. (FIG. 20)

Through holes TH are formed in the protective film PAS1 and, via these through holes TH, portions of the drain electrodes SD1 and portions of the source electrodes SD2 of the thin film transistors TFT are exposed.

It is preferable that these through holes TH are formed by dry etching. In this case, it is also preferable to form the through holes at the terminal portions of the gate signal lines GL and the drain signal lines DL simultaneously.

Figure 21:
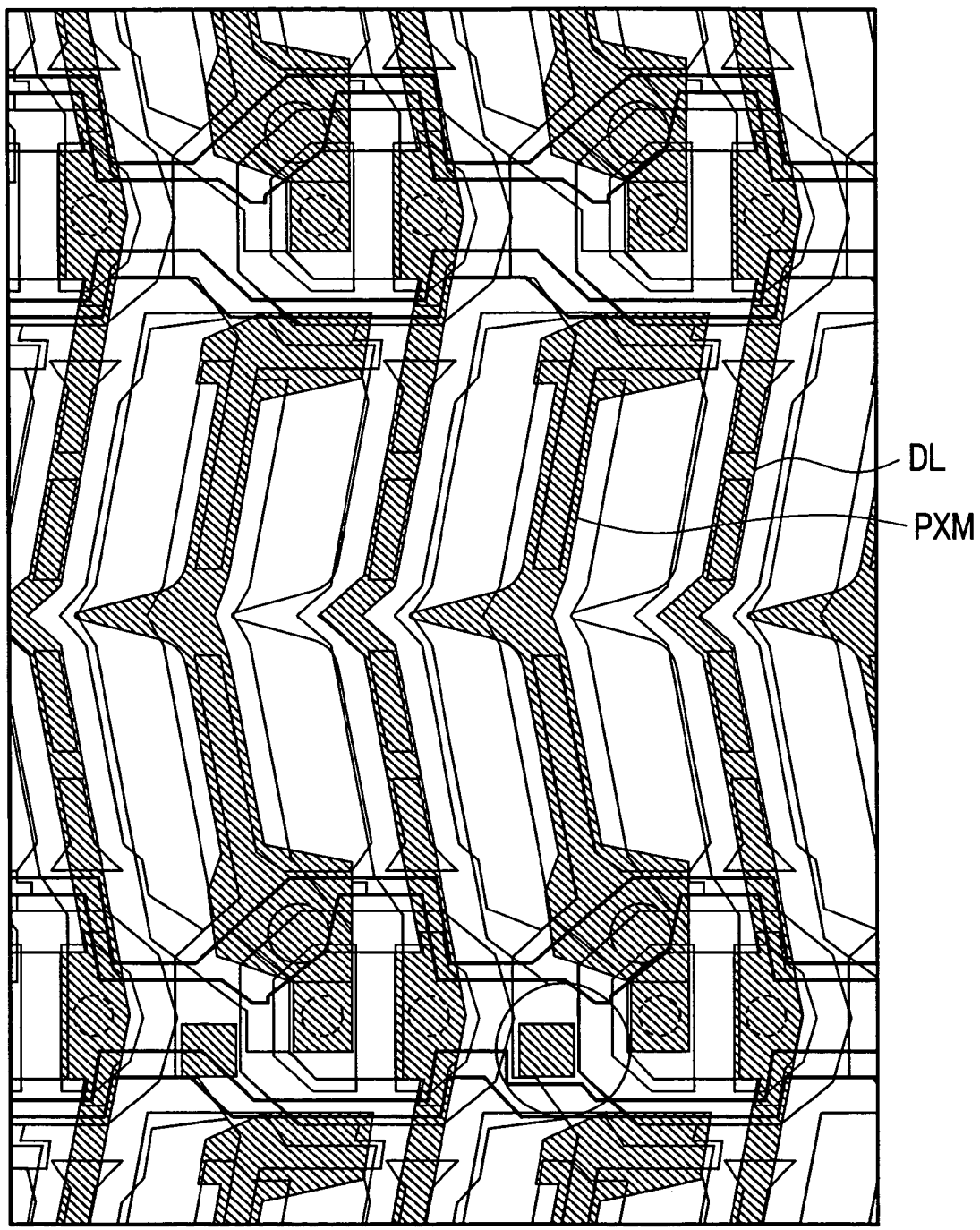
FIG. 21 is a plan view showing the fifth step out of steps for showing one embodiment of a manufacturing method of a liquid crystal display device according to the present invention.

Step 5 (FIG. 21)

Next, the drain signal lines DL, the lower-layer pixel electrodes PXM and the conductive layers are formed. Here, the conductive layers are formed on portions which face the columnar spacers.

As the material of the drain signal lines DL, the lower-layer pixel electrodes PXM and the conductive layers, a laminated body which is formed by sequentially laminating, for example, a Mo—Cr layer or a Mo—Zr layer having a thickness of approximately 60 nm, an Al—Nd layer having a thickness of approximately 250 nm, a Mo—Cr layer or a Mo—Zr layer having a thickness of approximately 60 nm is used.

Figure 22:
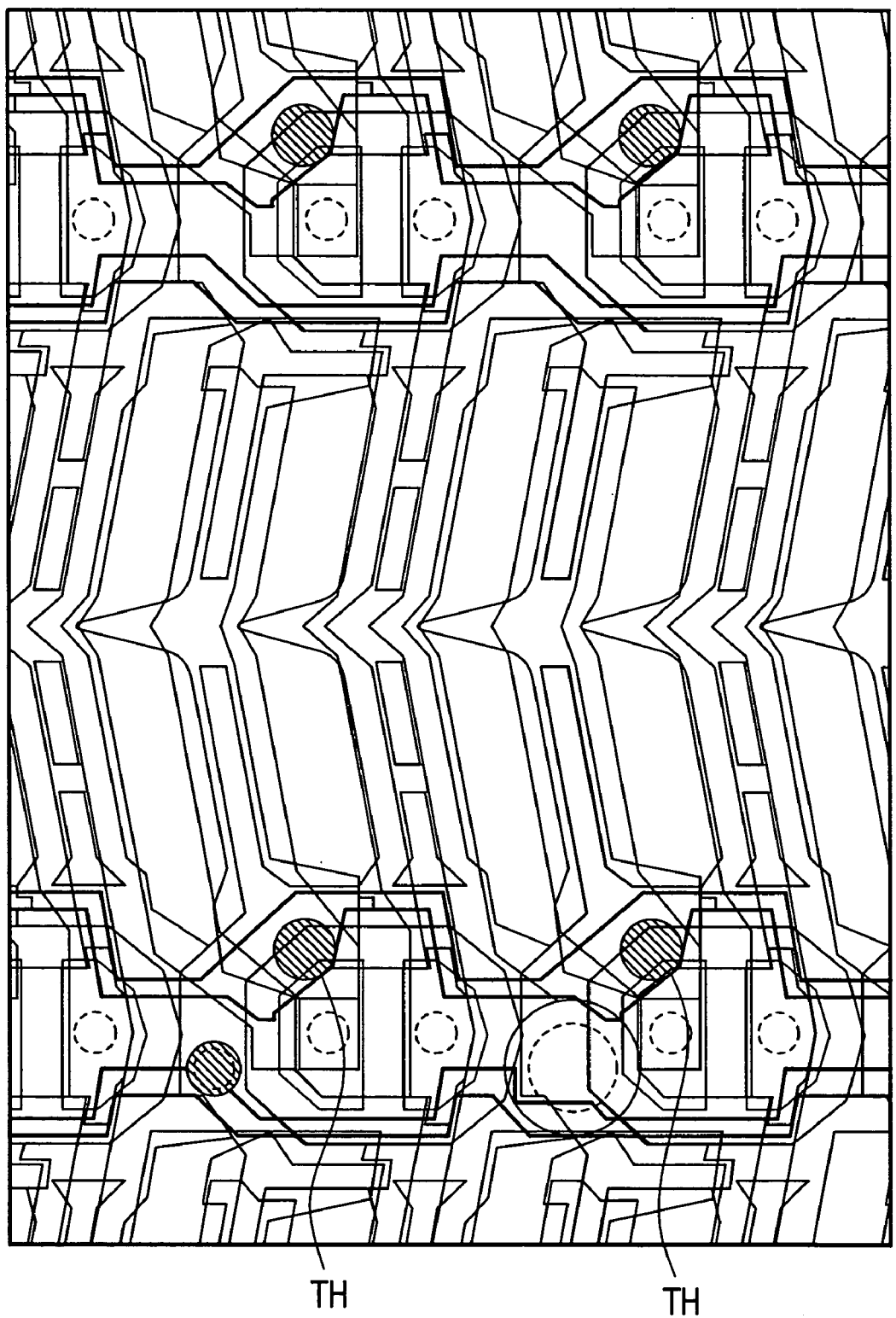
FIG. 22 is a plan view showing the sixth step out of steps for showing one embodiment of a manufacturing method of a liquid crystal display device according to the present invention.

Step 6 (FIG. 22)

The protective film PAS2 is formed. This protective film PAS2 is constituted of an organic material layer and is preferably formed by a coating method. The appropriate thickness of the protective film pAS2 is about 2000 nm. Then, by forming through holes TH in the protective film PAS2, portions of the extensions of the portions of the pixel electrodes PXM which are connected to the source electrodes SD2 of the thin film transistors TFT are exposed.

Figure 23:
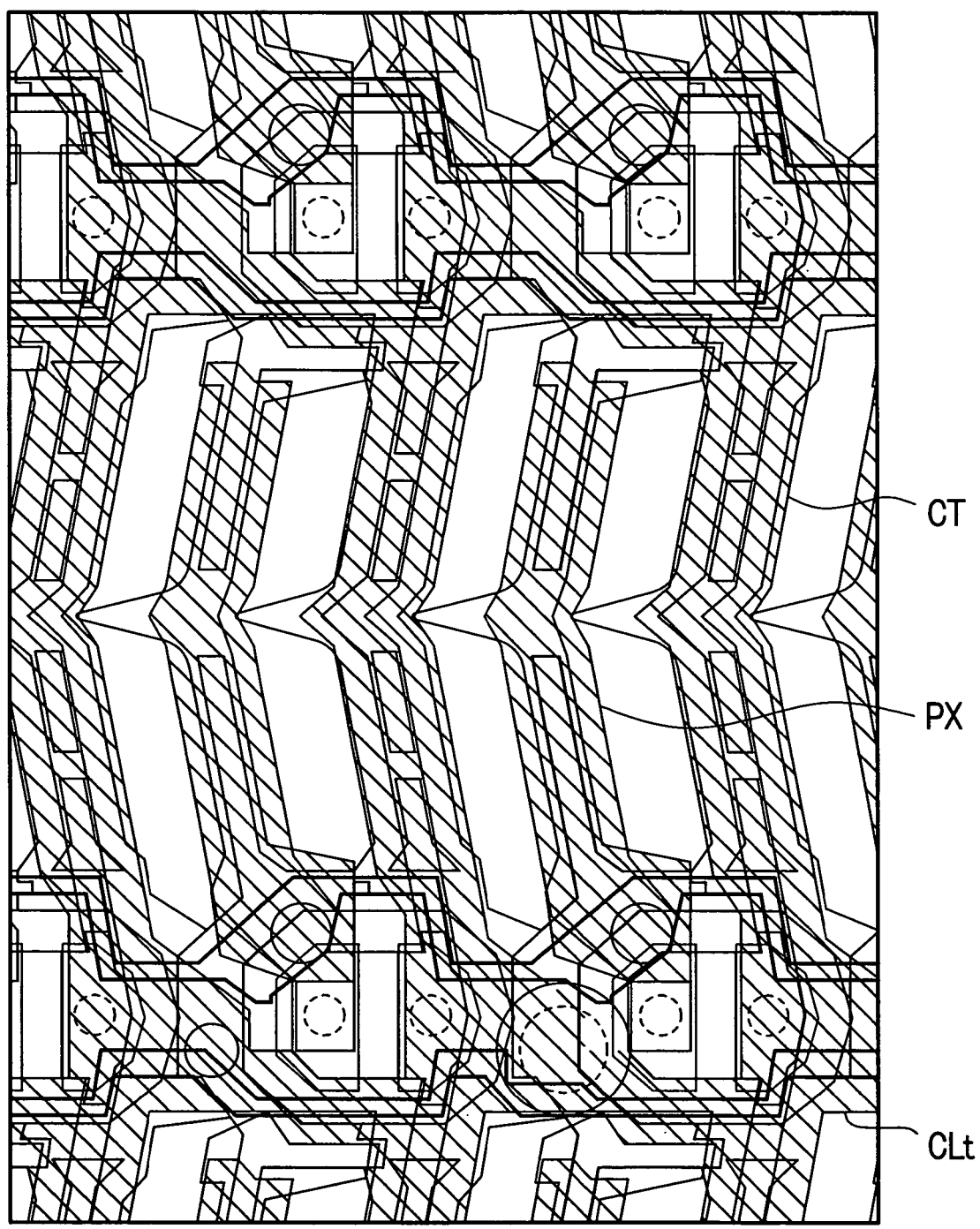
FIG. 23 is a plan view showing the seventh step out of steps for showing one embodiment of a manufacturing method of a liquid crystal display device according to the present invention.

Step 7. (FIG. 23)

On the surface of the protective film PAS2, the counter electrodes CT, the counter voltage signal lines CLt and the upper-layer pixel electrodes PX are formed. As the material of the counter electrodes CT, the counter voltage signal lines CLt and the upper-layer pixel electrodes PX, for example, a conductive layer having non light-transmitting property such as ITO (Indium Tin Oxide), ITZO (Indium Tin Zinc Oxide) or the like is used.

Embodiment 10

Figure 28:
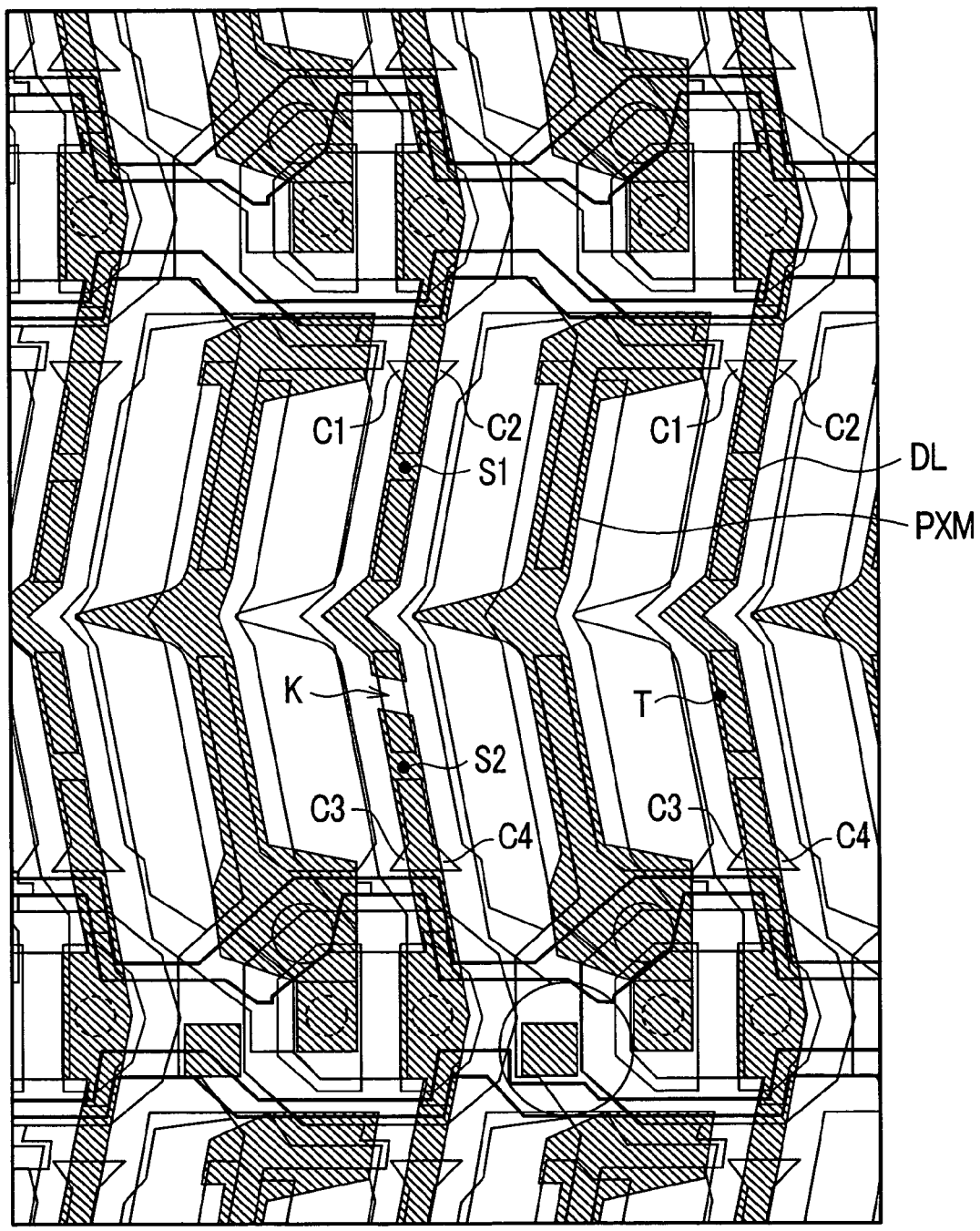
FIG. 28 is a constitutional view for showing another embodiment of a pixel of a liquid crystal display device according to the present invention.

FIG. 28 is a plan view showing another embodiment of the pixel of the liquid crystal display device according to the present invention and corresponds to FIG. 21, for example.

In this embodiment, when a short-circuited portion (for example, indicated by a T portion in the drawing) is formed between the counter electrode CTM and the drain signal line DL which is formed over the counter electrode CTM by way of the insulation layer, it is possible to repair the short-circuited portion using laser beams such that the display is not influenced. That is, portions of the conductive layer of the counter electrode CTM are arranged in the vicinity of the gate signal lines thus forming portions which are not overlapped to the drain signal lines and these portions C1, C2, C3, C4 are cut.

Further, when a portion where the drain signal line DL is disconnected (for example, indicated as a portion K in the drawing), the portions C1, C2, C3, C4 are cut by the laser beams and, thereafter, the laser beams are radiated to the short-circuited portions S1, S2, whereby the drain signal line DL is electrically connected to the portion which was the pattern of the counter electrode CTM.

Embodiment 11

Figure 29:
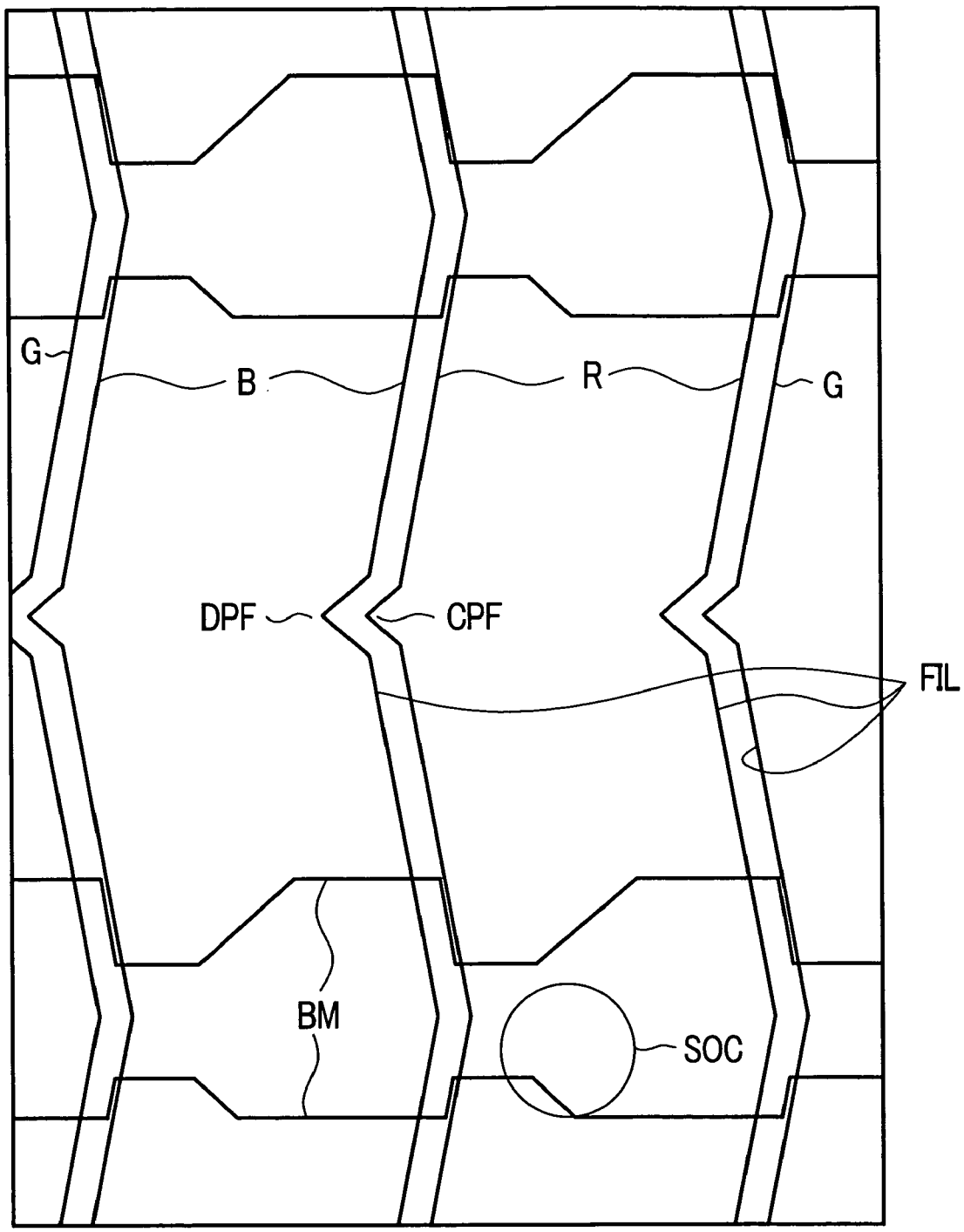
FIG. 29 is a constitutional view for showing another embodiment of a pixel of a liquid crystal display device according to the present invention.

FIG. 29 is a plan view showing another embodiment of the pixel of a liquid crystal display device according to the present invention and shows the constitution of color filters FIL formed on the liquid-crystal-side surface of the transparent substrate SUB2.

In the drawing, the black matrix BM has a pattern extending along the gate signal line GL and each color filter FIL is formed having bent portions in an L shape along the drain signal line DL. In conformity with the shape of the bent portions of the drain signal line DL, also on the bent portions of the above-mentioned color filter FIL, the projections CPF which are further projected from the convex-portion-side crests of the bent portions are formed. Alternatively, the notched portions DPF may be formed in the concave-portion side of the bent portion.

Due to such a constitution, leaking of light can be eliminated and a desired liquid crystal gap can be obtained.

The above-mentioned respective embodiments can be used individually or in combination. This is because the advantageous effect of the respective embodiments can be performed individually or in a combined form.

As can be clearly understood from the above explanation, the liquid crystal display device according to the present invention can improve the numerical aperture, can suppress the generation of the domain and can improve the display quality.

What is claimed is:

1. A liquid crystal display device comprising:
    a pair of substrates with a liquid crystal layer therebetween;
    a pixel electrode and a counter electrode formed on one of said pair of substrates;
    wherein said pixel electrode is formed in a zigzag shape having a plurality of V-shaped bent portions a convex-portion side of each V-shaped bent portion has a projection portion which is further projected from a crest of said convex-portion side of said each V-shaped bent portion, and a concave-portion side of said each V-shaped bent portion has a notched portion which further cuts into a bottom of said concave-portion side of said each V-shaped bent portion.

2. A liquid crystal device according to claim 1, wherein the pixel electrode and the counter electrode are transparent.

3. A liquid crystal display device comprising:
    a pair of substrates with a liquid crystal layer therebetween;
    a pixel electrode and a counter electrode formed on one of said pair of substrates and have a space in plan view therebetween;
    wherein said space is formed in a chevron shape pattern with a convex-portion side, a concave-portion side, a projection portion which is further projected from a crest of a convex-portion side of said chevron shape, a notched portion which further cuts into a bottom of said concave-portion side of said chevron shape.
    the convex-portion side and the concave-portion side of said chevron shape pattern have inclination angles of $\theta\,p1$ and $\theta\,p2$ with respect to a rubbing direction of an orientation film, said notched portion and said projection portion have inclination angles of $\theta\,d$ and $\theta\,j$ with respect to the rubbing direction, and having the relation of $\theta\,p1 < \theta\,d$, $\theta\,p1 < \theta\,j$, $\theta\,p2 < \theta\,d$, and $\theta\,p2 < \theta\,j$.

4. A liquid crystal display device comprising:
    a pair of substrates with a liquid crystal layer therebetween;
    a pixel electrode and a counter electrode formed on one of said pair of substrates;
    wherein the pixel electrode and the counter electrode are consist with an upper-layer electrode and a lower-layer electrode with an insulating layer therebetween, and the pixel electrode and the counter electrode are in a zigzag shape having a bent portion.

5. A liquid crystal display device according to claim 4, wherein the upper-layer electrode is transparent conductive layer and wider than the lower-layer electrode.

6. A liquid crystal display device comprising:
    a pair of substrates with a liquid crystal layer therebetween;
    a pixel electrode and a counter electrode formed on one of said pair of substrates;
    wherein the counter electrode have an upper-layer electrode and a lower-layer electrode,
    the upper-layer electrode is positioned at a layer over a drain signal line with a first insulating layer therebetween and overlaps with the drain signal line,
    the lower-layer electrode is positioned at a layer below the drain signal line with a second insulating layer therebetween and extends along the upper-layer electrode with an overlapping relation.

7. A liquid crystal display device according to claim 6, wherein the lower-layer electrode is formed at a both sides of the drain signal line and edges of the lower-layer electrode are inside of the upper-layer electrode.

8. A liquid crystal display device according to claim 6, wherein the upper-layer r electrode is transparent conductor and overlaps with a gate signal line with the first insulating layer and the second insulating layer therebetween.

* * * * *